(12) United States Patent
Byun et al.

(10) Patent No.: US 11,145,302 B2
(45) Date of Patent: Oct. 12, 2021

(54) SYSTEM FOR PROCESSING USER UTTERANCE AND CONTROLLING METHOD THEREOF

(71) Applicant: Samsung Electronics Co., Ltd., Gyeonggi-do (KR)

(72) Inventors: Dooho Byun, Gyeonggi-do (KR); Woonsoo Kim, Gyeonggi-do (KR); Taekwang Um, Gyeonggi-do (KR); Hyunkyung Kim, Gyeonggi-do (KR); Joohee Park, Gyeonggi-do (KR); Jaeyung Yeo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 16/263,012

(22) Filed: Jan. 31, 2019

(65) Prior Publication Data

US 2019/0267001 A1    Aug. 29, 2019

(30) Foreign Application Priority Data

Feb. 23, 2018 (KR) .......................... 10-2018-0021845

(51) Int. Cl.
*G10L 15/22*    (2006.01)
*G10L 15/18*    (2013.01)
(Continued)

(52) U.S. Cl.
CPC .............. *G10L 15/22* (2013.01); *G06F 40/35* (2020.01); *G10L 15/18* (2013.01);
(Continued)

(58) Field of Classification Search
CPC .............. G10L 15/22; G10L 2015/223; G10L 15/1815; G10L 15/26; G10L 15/30
See application file for complete search history.

(56) References Cited

U.S. PATENT DOCUMENTS

| 8,660,849 B2 | 2/2014 | Gruber et al. |
| 8,670,979 B2 | 3/2014 | Gruber et al. |

(Continued)

FOREIGN PATENT DOCUMENTS

| KR | 10-1511831 B1   | 4/2015 |
| KR | 10-2016-0060247 A | 5/2016 |
| KR | 10-1731867 B1   | 5/2017 |

OTHER PUBLICATIONS

International Search Report dated Apr. 17, 2019.
European Search Report dated Jun. 21, 2019.

*Primary Examiner* — Samuel G Neway
(74) *Attorney, Agent, or Firm* — Cha & Reiter, LLC

(57) ABSTRACT

A system is provided. The system may include a communication interface, at least one processor, and at least one memory. The memory may store instructions that, when executed, cause the processor to provide an ASR module and a plurality of NLU modules, and further cause the processor to receive first voice data including a first user utterance, to process the first voice data using the ASR module to generate first text data, to process the first text data using a first NLU module into a first intent and one or more context information items associated with the first intent, to provide a first response based on the first intent and the one or more context information items, and to provide at least part of the one or more context information items to at least one other NLU module.

20 Claims, 18 Drawing Sheets

(51) Int. Cl.
 *G10L 15/26* (2006.01)
 *G10L 15/30* (2013.01)
 *G06F 40/35* (2020.01)
(52) U.S. Cl.
 CPC .......... *G10L 15/1815* (2013.01); *G10L 15/26* (2013.01); *G10L 15/30* (2013.01); *G10L 2015/223* (2013.01); *G10L 2015/228* (2013.01)

(56) References Cited

U.S. PATENT DOCUMENTS

| | | | |
|---|---|---|---|
| 8,706,503 | B2 | 4/2014 | Cheyer et al. |
| 8,731,942 | B2 | 5/2014 | Cheyer et al. |
| 8,799,000 | B2 | 8/2014 | Guzzoni et al. |
| 8,892,446 | B2 | 11/2014 | Cheyer et al. |
| 8,903,716 | B2 | 12/2014 | Chen et al. |
| 8,930,191 | B2 | 1/2015 | Gruber et al. |
| 8,942,986 | B2 | 1/2015 | Cheyer et al. |
| 9,070,366 | B1 | 6/2015 | Mathias et al. |
| 9,117,447 | B2 | 8/2015 | Gruber et al. |
| 9,190,055 | B1* | 11/2015 | Kiss ........................ G10L 15/07 |
| 9,292,492 | B2 | 3/2016 | Sarikaya et al. |
| 9,318,108 | B2 | 4/2016 | Gruber et al. |
| 9,424,840 | B1 | 8/2016 | Hart et al. |
| 9,436,678 | B2 | 9/2016 | Mathias et al. |
| 9,548,050 | B2 | 1/2017 | Gruber et al. |
| 9,613,025 | B2 | 4/2017 | Heo et al. |
| 9,754,589 | B2 | 9/2017 | Mathias et al. |
| 9,959,869 | B2 | 5/2018 | Mathias et al. |
| 10,026,394 | B1 | 7/2018 | Carbon et al. |
| 10,191,999 | B2 | 1/2019 | Liu et al. |
| 2012/0016678 | A1 | 1/2012 | Gruber et al. |
| 2012/0245944 | A1 | 9/2012 | Gruber et al. |
| 2012/0259753 | A1* | 10/2012 | Orad ...................... G06Q 40/00 705/35 |
| 2013/0110505 | A1 | 5/2013 | Gruber et al. |
| 2013/0110515 | A1 | 5/2013 | Guzzoni et al. |
| 2013/0110518 | A1 | 5/2013 | Gruber et al. |
| 2013/0110519 | A1 | 5/2013 | Cheyer et al. |
| 2013/0110520 | A1 | 5/2013 | Cheyer et al. |
| 2013/0111348 | A1 | 5/2013 | Gruber et al. |
| 2013/0111487 | A1 | 5/2013 | Cheyer et al. |
| 2013/0117022 | A1 | 5/2013 | Chen et al. |
| 2013/0185074 | A1 | 7/2013 | Gruber et al. |
| 2013/0185081 | A1 | 7/2013 | Cheyer et al. |
| 2014/0163959 | A1* | 6/2014 | Hebert .................... G06F 40/30 704/9 |
| 2014/0222422 | A1 | 8/2014 | Sarikaya et al. |
| 2014/0257793 | A1 | 9/2014 | Gandrabur et al. |
| 2014/0309990 | A1* | 10/2014 | Gandrabur .............. G06F 40/30 704/9 |
| 2015/0302002 | A1* | 10/2015 | Mathias .................. G06F 40/56 704/9 |
| 2015/0317302 | A1* | 11/2015 | Liu ................... G06F 16/90332 704/9 |
| 2016/0042748 | A1 | 2/2016 | Jain et al. |
| 2016/0140958 | A1 | 5/2016 | Heo et al. |
| 2016/0259775 | A1 | 9/2016 | Gelfenbeyn et al. |
| 2017/0116985 | A1 | 4/2017 | Mathias et al. |
| 2017/0178626 | A1 | 6/2017 | Gruber et al. |
| 2018/0012597 | A1 | 1/2018 | Mathias et al. |
| 2018/0025726 | A1 | 1/2018 | Gatti de Bayser et al. |
| 2018/0060303 | A1* | 3/2018 | Sarikaya ............... G10L 15/063 |
| 2018/0068663 | A1* | 3/2018 | Choi ..................... H04L 12/2818 |
| 2018/0315425 | A1 | 11/2018 | Mathias et al. |
| 2019/0179902 | A1* | 6/2019 | Srivastava .............. G06F 21/31 |
| 2019/0267001 | A1* | 8/2019 | Byun ..................... G10L 15/26 |

\* cited by examiner

SYSTEM FOR PROCESSING USER UTTERANCE AND CONTROLLING METHOD THEREOF

CROSS-REFERENCE TO RELATED APPLICATION(S)

This application is based on and claims priority under 35 U.S.C. § 119 to Korean Patent Application No. 10-2018-0021845, filed on Feb. 23, 2018, in the Korean Intellectual Property Office, the disclosure of which is incorporated by reference herein its entirety.

BACKGROUND

1. Field

The present disclosure generally relates to a technology for processing user utterances.

2. Description of Related Art

In addition to conventional input methods such as using keyboards and/or mice, electronic devices have recently supported various other input schemes such as voice input and the like. For example, electronic devices such as smart phones or tablet PCs may receive a user voice input and then may provide a service or perform an operation corresponding to the user voice input.

The speech recognition service used in this voice input method is being developed based on natural language processing technology. This technology for processing natural language generally refers to technology that understands the intent of the user as indicated by the user utterance and generates a result matched with the intent. The result may then be used to provide a service to the user.

The above information is presented as background information only to assist with an understanding of the present disclosure. No determination has been made, and no assertion is made, as to whether any of the above might be applicable as prior art with regard to the present disclosure.

SUMMARY

As the electronic device provides numerous services, it may provide a specified service corresponding to a user utterance by processing the user utterance through an external server. The external server may include a database and an artificial intelligence (AI) system for processing the user utterance and for analyzing the user utterance accurately. The accuracy of the external server may be better than the electronic device. In particular, the external server may include separate analysis systems operating independently to process the user utterance for various third party applications. As such, when the electronic device processes the user utterance by using the external server that includes independent modules for each service, there is an inconvenience in that information necessary for multiple services may have to be repeatedly input because the independent modules cannot share the information.

Aspects of the present disclosure are to address at least the above-mentioned problems and/or disadvantages and to provide at least the advantages described below. Accordingly, an aspect of the present disclosure is to provide a system that enables context information, which is included in a user utterance and which is necessary for multiple services, to be shared between modules for processing different services.

In accordance with an aspect of the present disclosure, a system may include a communication interface, at least one processor operatively connected to the communication interface, and at least one memory operatively connected to the at least one processor. The at least one memory may store instructions that, when executed, cause the processor to provide an automatic speech recognition (ASR) module and a plurality of natural language understanding (NLU) modules that operate independently of one another, and further cause the processor to receive first voice data including a first user utterance via the communication interface, to process the first voice data using the ASR module to generate first text data, to process the first text data using a first NLU module of the plurality of NLU modules into a first intent and one or more context information items associated with the first intent, to provide a first response via the communication interface, based at least partly on the first intent and the one or more context information items, and to provide at least part of the one or more context information items to at least one other NLU module of the plurality of NLU modules.

In accordance with another aspect of the present disclosure, a method for sharing context information may include receiving first voice data including a first user utterance, processing the first voice data to generate first text data, processing the first text data by using a first NLU module of a plurality of NLU modules into a first intent and one or more context information items associated with the first intent, providing a first response based at least partly on the first intent and the one or more context information items, and providing at least part of the one or more context information items to at least one other NLU module of the plurality of NLU modules.

According to various embodiments of the present disclosure, an intelligent server may enable context information necessary to process a user utterance to be shared between a plurality of chatbots providing different services, thereby preventing duplicative user interactions with an intelligent server where the user repeatedly inputs sharable context information for multiple chatbots.

In addition, a variety of other effects directly or indirectly understood through the present disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Hereinafter, various embodiments of the present disclosure may be described to be associated with accompanying drawings. Accordingly, those of ordinary skill in the art will recognize that modification, equivalent, and/or alternative on the various embodiments described herein can be variously made without departing from the scope and spirit of the present disclosure.

Before describing an embodiment of the disclosure, an integrated intelligent system to which an embodiment of the disclosure is applied will be described.

Figure 1:
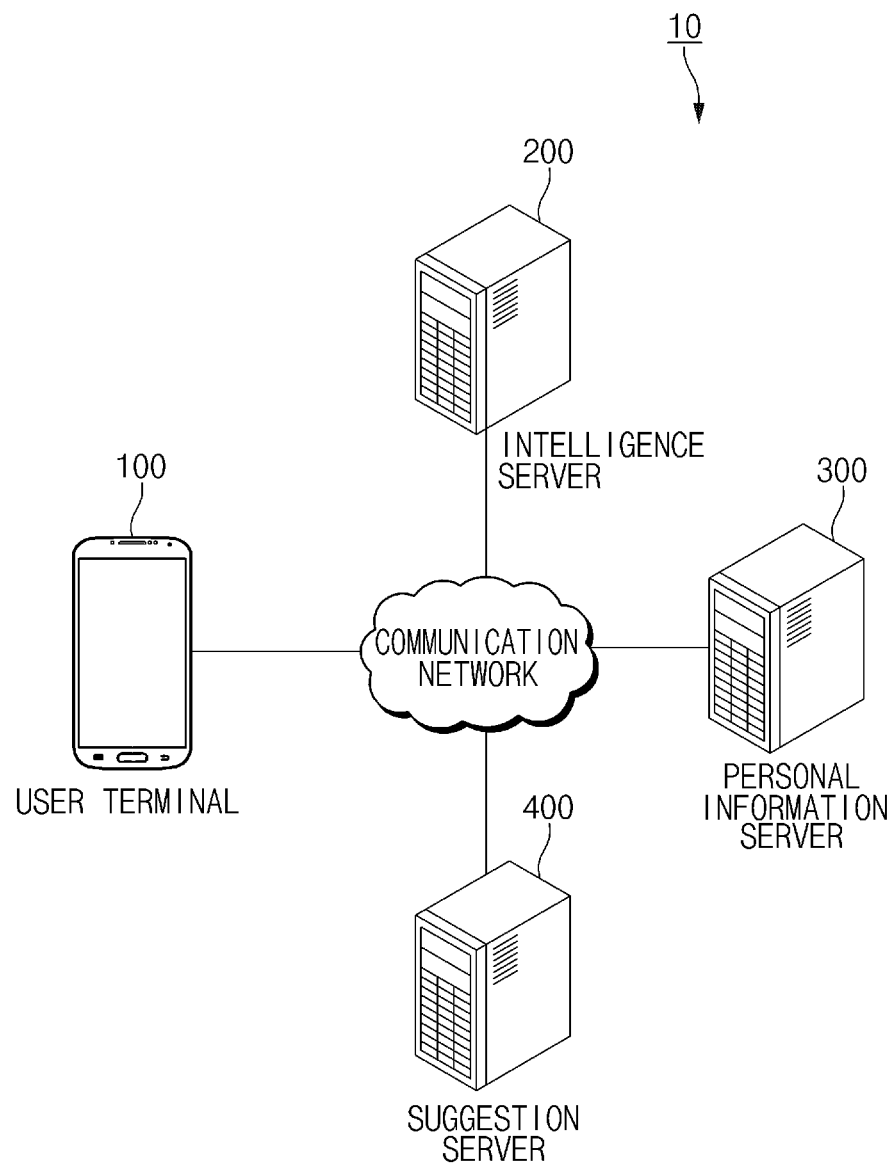
FIG. 1 is a view illustrating an integrated intelligent system, according to various embodiments of the present disclosure.

FIG. 1 is a view illustrating an integrated intelligent system, according to various embodiments of the present disclosure.

Referring to FIG. 1, an integrated intelligent system 10 may include a user terminal 100, an intelligence server 200, a personal information server 300, or a suggestion server 500.

The user terminal 100 may provide a service for a user through an app (or an application program) (e.g., an alarm app, a message app, a picture (gallery) app, or the like) stored in the user terminal 100. For example, the user terminal 100 may launch and operate another app through an intelligence app (or speech recognition app) stored in the user terminal 100. The user terminal 100 may receive a user input for launching or operating the other app through the intelligence app. For example, the user input may be received through a physical button, a touch pad, a voice input, a remote input, or the like. According to an embodiment, various types of terminal devices (or an electronic device), which are connected with Internet, such as a mobile phone, a smartphone, personal digital assistant (PDA), a notebook computer, and the like may correspond to the user terminal 100.

According to an embodiment, the user terminal 100 may receive user utterance as a user input. The user terminal 100 may receive the user utterance and may generate a command for operating an app based on the user utterance. As such, the user terminal 100 may operate the app by using the command.

The intelligence server 200 may receive a voice input of a user from the user terminal 100 over a communication network and may convert the voice input to text data. In another embodiment, the intelligence server 200 may generate (or select) a path rule based on the text data. The path rule may include information about an action (or an operation) for performing the function of an app or information about a parameter utilized to perform the action. In addition, the path rule may include the order of the action of the app. The user terminal 100 may receive the path rule, may select an app depending on the path rule, and may execute the action included in the path rule in the selected app.

Generally, the term "path rule" of the present disclosure may indicate, but is not limited to, the sequence of states in which an electronic device performs the task requested by the user. In other words, the path rule may include information about the sequence of the states. For example, the task may be a certain action that the intelligence app is capable of providing. The task may include the generation of a schedule, the transmission of a picture to the desired other party, or the provision of weather information. The user terminal 100 may perform the task by sequentially having at least one or more states (e.g., an operating state of the user terminal 100).

According to an embodiment, the path rule may be provided or generated by an artificial intelligent (AI) system. The artificial intelligent system may be a rule-based system, or may be a neural network-based system (e.g., a feed forward neural network (FNN) or a recurrent neural network (RNN)). Alternatively, the artificial intelligent system may be a combination of the above-described systems or an artificial intelligent system different from the above-described system. According to an embodiment, the path rule may be selected from a set of predefined path rules or may be generated in real time in response to a user request. For example, the artificial intelligent system may select at least a path rule of predefined plurality of path rules, or may generate a path rule dynamically (or in real time). Furthermore, the user terminal 100 may use a hybrid system to provide the path rule.

According to an embodiment, the user terminal 100 may execute the action and may display a screen corresponding to a state of the user terminal 100, which executes the action, in a display. For another example, the user terminal 100 may execute the action and may not display the result obtained by executing the action in the display. For example, the user terminal 100 may execute a plurality of actions and may display the result of a part of the plurality of actions in the display. For example, the user terminal 100 may display the result, which is obtained by executing the last action, in the display. For another example, the user terminal 100 may receive the user input to display the result obtained by executing the action in the display.

The personal information server 300 may include a database in which user information is stored. For example, the personal information server 300 may receive the user information (e.g., context information, information about execution of an app, or the like) from the user terminal 100 and may store the user information in the database. The intelligence server 200 may receive the user information from the personal information server 300 over the communication network and may use the user information when generating a path rule associated with the user input. According to an embodiment, the user terminal 100 may receive the user information from the personal information server 300 over the communication network, and may use the user information as information for managing the database.

The suggestion server 500 may include a database storing information about a function in a terminal, introduction of an application, or a function to be provided. For example, the suggestion server 500 may receive the user information of the user terminal 100 from the personal information server 300 and may include the database storing information about a function that a user is capable of utilizing. The user terminal 100 may receive information about the function to be provided from the suggestion server 500 over the communication network and may provide the received information to the user.

Figure 2:
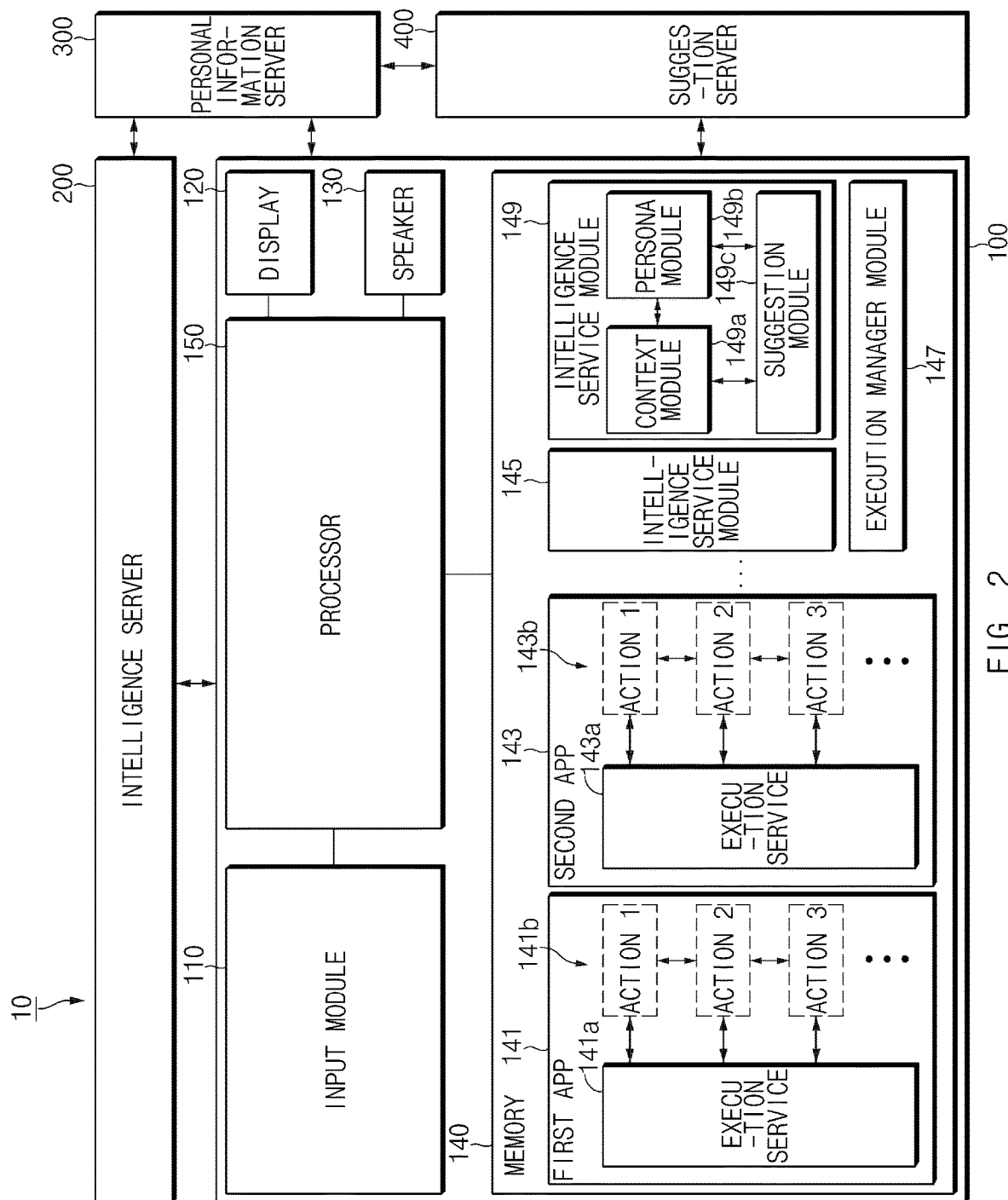
FIG. 2 is a block diagram illustrating a user terminal of an integrated intelligent system, according to an embodiment of the present disclosure.

FIG. 2 is a block diagram illustrating a user terminal of an integrated intelligent system, according to an embodiment of the present disclosure.

Referring to FIG. 2, the user terminal 100 may include an input module 110, a display 120, a speaker 130, a memory 140, or a processor 150. The user terminal 100 may further include a housing, and elements of the user terminal 100 may be seated in the housing or may be positioned on the housing. The user terminal 100 may further include a communication circuit positioned in the housing. The user terminal 100 may transmit or receive data (or information) to or from an external server (e.g., the intelligence server 200) through the communication circuit.

According to an embodiment, the input module 110 may receive a user input from a user. For example, the input module 110 may receive the user input from the connected external device (e.g., a keyboard or a headset). For another example, the input module 110 may include a touch screen (e.g., a touch screen display) coupled to the display 120. For another example, the input module 110 may include a hardware key (or a physical key) placed in the user terminal 100 (or the housing of the user terminal 100).

According to an embodiment, the input module 110 may include a microphone that is capable of receiving the utterance of the user as a sound signal. For example, the input module 110 may include a speech input system and may receive the utterance of the user as a sound signal through the speech input system. For example, the microphone may be exposed through a part (e.g., a first portion) of the housing.

According to an embodiment, the display 120 may display an image, a video, and/or an execution screen of an application. For example, the display 120 may display a graphic user interface (GUI) of an app. According to an embodiment, the display 120 may be exposed to a part (e.g., a second part) of the housing.

According to an embodiment, the speaker 130 may output the sound signal. For example, the speaker 130 may output the voice signal generated in the user terminal 100 to the outside. According to an embodiment, the speaker 130 may be exposed to a part (e.g., a third part) of the housing.

According to an embodiment, the memory 140 may store a plurality of apps (or application program) 141 and 143. For example, the plurality of apps 141 and 143 may be a program for performing a function corresponding to the user input. According to an embodiment, the memory 140 may store an intelligence agent 145, an execution manager module 147, or an intelligence service module 149. For example, the intelligence agent 145, the execution manager module 147 and the intelligence service module 149 may be a framework (or application framework) for processing the received user input (e.g., user utterance).

According to an embodiment, the memory 140 may include a database capable of storing information utilized to recognize the user input. For example, the memory 140 may include a log database capable of storing log information. For another example, the memory 140 may include a persona database capable of storing user information.

According to an embodiment, the memory 140 may store the plurality of apps 141 and 143, and the plurality of apps 141 and 143 may be loaded to operate. For example, the plurality of apps 141 and 143 stored in the memory 140 may operate after being loaded by the execution manager module 147. The plurality of apps 141 and 143 may include execution service modules 141*a* and 143*a* performing a function. In an embodiment, the plurality of apps 141 and 143 may perform a plurality of actions (e.g., a sequence of states) 141*b* and 143*b* through execution service modules 141*a* and 143*a* for the purpose of performing a function. In other words, the execution service modules 141*a* and 143*a* may be activated by the execution manager module 147, and then may execute the plurality of actions 141*b* and 143*b*.

According to an embodiment, when the actions 141*b* and 143*b* of the apps 141 and 143 are executed, an execution state screen according to the execution of the actions 141*b* and 143*b* may be displayed in the display 120. For example, the execution state screen may be a screen in a state where the actions 141*b* and 143*b* are completed. For another example, the execution state screen may be a screen in a state where the execution of the actions 141*b* and 143*b* is in partial landing (e.g., in the case where a parameter utilized for the actions 141*b* and 143*b* are not entered).

According to an embodiment, the execution service modules 141*a* and 143*a* may execute the actions 141*b* and 143*b* depending on a path rule. For example, the execution service modules 141*a* and 143*a* may be activated by the execution manager module 147, may receive an execution request from the execution manager module 147 depending on the path rule, and may execute functions of the apps 141 and 143 by performing the actions 141*b* and 143*b* depending on the execution request. When the execution of the actions 141*b* and 143b is completed, the execution service modules 141a and 143a may transmit completion information to the execution manager module 147.

According to an embodiment, in the case where the plurality of the actions 141b and 143b are respectively executed in the apps 141 and 143, the plurality of the actions 141b and 143b may be sequentially executed. When the execution of one action (e.g., action 1 of the first app 141 or action 1 of the second app 143) is completed, the execution service modules 141a and 143a may open the next action (e.g., action 2 of the first app 141 or action 2 of the second app 143) and may transmit the completion information to the execution manager module 147. Here, it is understood that opening an arbitrary action is to change a state of the arbitrary action to an executable state or to prepare the execution of the action. In other words, when the arbitrary action is not opened, the corresponding action may be not executed. When the completion information is received, the execution manager module 147 may transmit the execution request associated with the next action (e.g., action 2 of the first app 141 or action 2 of the second app 143) to the execution service modules 141a and 143a. According to an embodiment, in the case where the plurality of apps 141 and 143 are launched, the plurality of apps 141 and 143 may be sequentially launched. For example, when receiving the completion information after the execution of the last action (e.g., action 3 of the first app 141) of the first app 141 is executed, the execution manager module 147 may transmit the execution request of the first action (e.g., action 1 of the second app 143) of the second app 143 to the execution service module 143a.

According to an embodiment, in the case where the plurality of the actions 141b and 143b are executed in the apps 141 and 143, a result screen according to the execution of each of the executed plurality of the actions 141b and 143b may be displayed in the display 120. According to an embodiment, a part of a plurality of result screens according to the executed plurality of the actions 141b and 143b may be displayed in the display 120.

According to an embodiment, the memory 140 may store an intelligence app (e.g., a speech recognition app) operating in conjunction with the intelligence agent 145. The app operating in conjunction with the intelligence agent 145 may receive and process the utterance of the user as a voice signal. According to an embodiment, the app operating in conjunction with the intelligence agent 145 may be operated by a specific input (e.g., an input through a hardware key, an input through a touch screen, or a specific voice input) input through the input module 110.

According to an embodiment, the intelligence agent 145, the execution manager module 147, or the intelligence service module 149 stored in the memory 140 may be performed by the processor 150. The functions of the intelligence agent 145, the execution manager module 147, or the intelligence service module 149 may be implemented by the processor 150. It is described that the function of each of the intelligence agent 145, the execution manager module 147, and the intelligence service module 149 is the operation of the processor 150. According to an embodiment, the intelligence agent 145, the execution manager module 147, or the intelligence service module 149 stored in the memory 140 may be implemented with hardware as well as software.

According to an embodiment, the processor 150 may control overall actions of the user terminal 100. For example, the processor 150 may control the input module 110 to receive the user input. The processor 150 may control the display 120 to display an image. The processor 150 may control the speaker 130 to output the voice signal. The processor 150 may control the memory 140 to execute a program and to read or store information.

In an embodiment, the processor 150 may execute the intelligence agent 145, the execution manager module 147, or the intelligence service module 149 stored in the memory 140. As such, the processor 150 may implement the function of the intelligence agent 145, the execution manager module 147, or the intelligence service module 149.

According to an embodiment, the processor 150 may execute the intelligence agent 145 to generate a command for launching an app based on the voice signal received as the user input. According to an embodiment, the processor 150 may execute the execution manager module 147 to launch the apps 141 and 143 stored in the memory 140 depending on the generated command. According to an embodiment, the processor 150 may execute the intelligence service module 149 to manage information of a user and may process a user input by using the information of the user.

The processor 150 may execute the intelligence agent 145 to transmit a user input received through the input module 110 to the intelligence server 200 and may process the user input through the intelligence server 200.

According to an embodiment, before transmitting the user input to the intelligence server 200, the processor 150 may execute the intelligence agent 145 to pre-process the user input. According to an embodiment, to pre-process the user input, the intelligence agent 145 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input and may search for a part in which the user voice is present, by using the detected end-point. The AGC module may recognize the user input and may adjust the volume of the user input so as to be suitable to process the recognized user input. According to an embodiment, the processor 150 may execute all the pre-processing elements for performance. However, in another embodiment, the processor 150 may execute a part of the pre-processing elements to operate at low power.

According to an embodiment, the intelligence agent 145 may execute a wakeup recognition module stored in the memory 140 for the purpose of recognizing a call of a user. As such, the processor 150 may recognize the wakeup command of a user through the wakeup recognition module and may execute the intelligence agent 145 for receiving user input when receiving the wakeup command. The wakeup recognition module may be implemented with a low-power processor (e.g., a processor included in an audio codec). According to an embodiment, when receiving a user input through a hardware key, the processor 150 may execute the intelligence agent 145. In the case where the intelligence agent 145 is executed, an intelligence app (e.g., a speech recognition app) operating in conjunction with the intelligence agent 145 may be executed.

According to an embodiment, the intelligence agent 145 may include an utterance recognition module for performing the user input. The processor 150 may recognize the user input for executing an action in an app through the utterance recognition module. For example, the processor 150 may recognize a limited user (voice) input (e.g., an utterance such as "click" for performing a capture operation when a camera app is being executed) for performing an action such as the wakeup command in the apps 141 and 143 through the utterance recognition module. For example, the processor 150 may assist the intelligence server 200 to recognize and rapidly process a user command capable of being processed in the user terminal 100 through the utterance recognition module. According to an embodiment, the utterance recognition module of the intelligence agent 145 for executing a user input may be implemented in an app processor.

According to an embodiment, the utterance recognition module (including the utterance recognition module of a wake up module) of the intelligence agent 145 may recognize the user input by using an algorithm for recognizing a voice. For example, the algorithm for recognizing the voice may be at least one of a hidden Markov model (HMM) algorithm, an artificial neural network (ANN) algorithm, or a dynamic time warping (DTW) algorithm.

According to an embodiment, the processor 150 may execute the intelligence agent 145 to convert the voice input of the user into text data. For example, the processor 150 may transmit the voice of the user to the intelligence server 200 through the intelligence agent 145 and may receive the text data corresponding to the voice of the user from the intelligence server 200. As such, the processor 150 may display the converted text data in the display 120.

According to an embodiment, the processor 150 may execute the intelligence agent 145 to receive a path rule from the intelligence server 200. According to an embodiment, the processor 150 may transmit the path rule to the execution manager module 147 through the intelligence agent 145.

According to an embodiment, the processor 150 may execute the intelligence agent 145 to transmit the execution result log according to the path rule received from the intelligence server 200 to the intelligence service module 149, and the transmitted execution result log may be accumulated and managed in preference information of the user of a persona module 149b.

According to an embodiment, the processor 150 may execute the execution manager module 147, may receive the path rule from the intelligence agent 145, and may execute the apps 141 and 143; and the processor 150 may allow the apps 141 and 143 to execute the actions 141b and 143b included in the path rule. For example, the processor 150 may transmit command information (e.g., path rule information) for executing the actions 141b and 143b to the apps 141 and 143, through the execution manager module 147; and the processor 150 may receive completion information of the actions 141b and 143b from the apps 141 and 143.

According to an embodiment, the processor 150 may execute the execution manager module 147 to transmit the command information (e.g., path rule information) for executing the actions 141b and 143b of the apps 141 and 143 between the intelligence agent 145 and the apps 141 and 143. The processor 150 may bind the apps 141 and 143 to be executed depending on the path rule through the execution manager module 147 and may transmit the command information (e.g., path rule information) of the actions 141b and 143b included in the path rule to the apps 141 and 143. For example, the processor 150 may sequentially transmit the actions 141b and 143b included in the path rule to the apps 141 and 143, through the execution manager module 147 and may sequentially execute the actions 141b and 143b of the apps 141 and 143 depending on the path rule.

According to an embodiment, the processor 150 may execute the execution manager module 147 to manage execution states of the actions 141b and 143b of the apps 141 and 143. For example, the processor 150 may receive information about the execution states of the actions 141b and 143b from the apps 141 and 143, through the execution manager module 147. For example, in the case where the execution states of the actions 141b and 143b are in partial landing (e.g., in the case where a parameter utilized for the actions 141b and 143b are not input), the processor 150 may transmit information about the partial landing to the intelligence agent 145, through the execution manager module 147. The processor 150 may make a request for an input of information (e.g., parameter information) to the user by using the received information through the intelligence agent 145. For another example, in the case where the execution state of each of the actions 141b and 143b is an operating state, the processor 150 may receive an utterance from the user through the intelligence agent 145. The processor 150 may transmit information about the apps 141 and 143 being executed and the execution states of the apps 141 and 143 to the intelligence agent 145, through the execution manager module 147. The processor 150 may transmit the user utterance to the intelligence server 200 through the intelligence agent 145. The processor 150 may receive parameter information of the utterance of the user from the intelligence server 200 through the intelligence agent 145. The processor 150 may transmit the received parameter information to the execution manager module 147 through the intelligence agent 145. The execution manager module 147 may change a parameter of each of the actions 141b and 143b to a new parameter by using the received parameter information.

According to an embodiment, the processor 150 may execute the execution manager module 147 to transmit parameter information included in the path rule to the apps 141 and 143. In the case where the plurality of apps 141 and 143 are sequentially executed depending on the path rule, the execution manager module 147 may transmit the parameter information included in the path rule from one app to another app.

According to an embodiment, the processor may execute the execution manager module 147 to receive a plurality of path rules. The processor 150 may receive a plurality of path rules through the execution manager module 147 based on the utterance of a user. For example, in the case where the user utterance specifies one app 141 executing one action 141b but does not specify the other app 143 executing the other action 143b, the processor 150 may receive a plurality of different path rules, in which the same app 141 (e.g., gallery app) executing the one action 141b is executed and in which the different app 143 (e.g., message app or Telegram app) executing the other action 143b is executed, through the execution manager module 147. For example, the processor 150 may execute the same actions 141b and 143b (e.g., the same successive actions 141b and 143b) of the plurality of path rules, through the execution manager module 147. In the case where the execution manager module 147 executes the same action, the processor 150 may display a state screen for selecting the different apps 141 and 143 respectively included in the plurality of path rules in the display 120, through the execution manager module 147.

According to an embodiment, the intelligence service module 149 may include a context module 149a, the persona module 149b, or a suggestion module 149c.

The processor 150 may execute the context module 149a to collect current states of the apps 141 and 143 from the apps 141 and 143. For example, the processor 150 may execute the context module 149a to receive context information indicating the current states of the apps 141 and 143 and may collect the current states of the apps 141 and 143 through the received context information.

The processor 150 may execute the persona module 149*b* to manage personal information of the user utilizing the user terminal 100. For example, the processor 150 may execute the persona module 149*b* to collect usage information and the execution result of the user terminal 100 and may manage the personal information of the user by using the collected usage information and the collected execution result of the user terminal 100.

The processor 150 may execute the suggestion module 149*c* to predict the intent of the user and may recommend a command to the user based on the intent of the user. For example, the processor 150 may execute the suggestion module 149*c* to recommend a command to the user depending on the current state (e.g., a time, a place, a situation, or an app) of the user.

Figure 3:
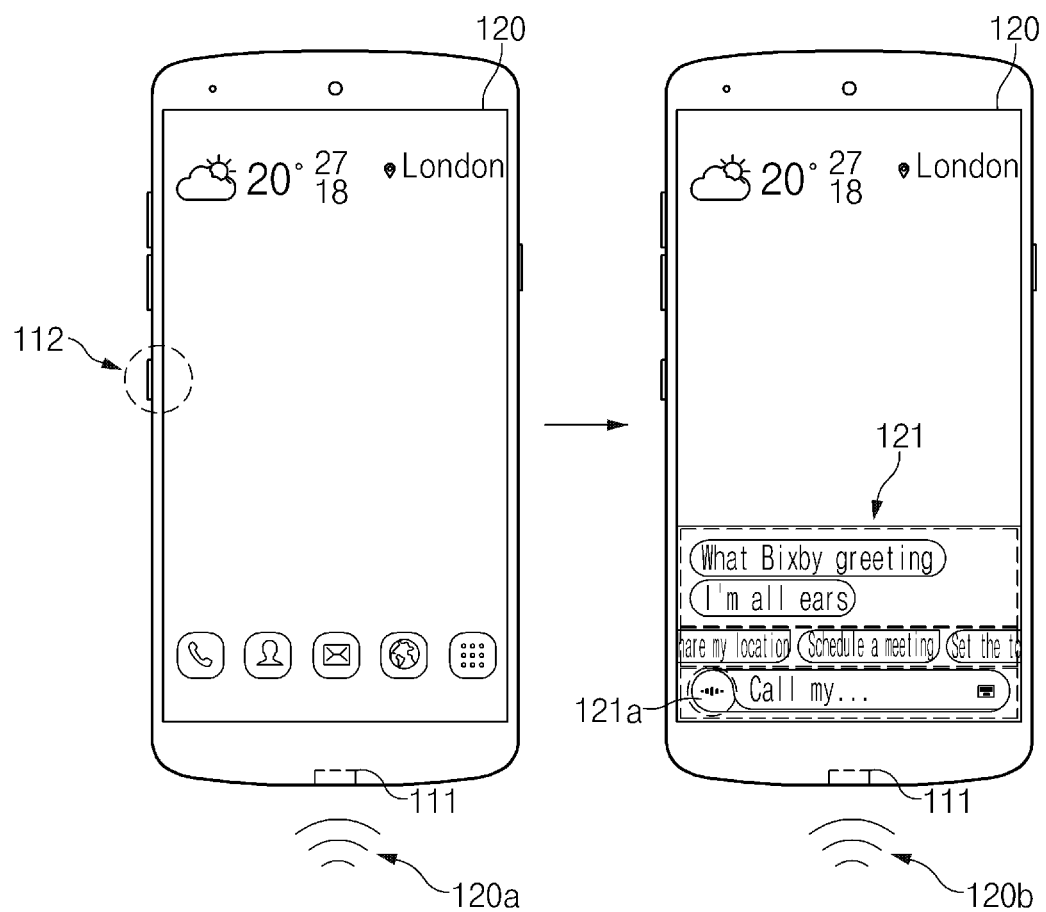
FIG. 3 that an intelligence app of a user terminal is executed, according to an embodiment of the present disclosure.

FIG. 3 is a view illustrating that an intelligence app of a user terminal is executed, according to an embodiment of the present disclosure.

FIG. 3 illustrates that the user terminal 100 receives a user input to execute an intelligence app (e.g., a speech recognition app) operating in conjunction with the intelligence agent 145.

According to an embodiment, the user terminal 100 may execute the intelligence app for recognizing a voice through a hardware key 112. For example, in the case where the user terminal 100 receives the user input through the hardware key 112, the user terminal 100 may display a UI 121 of the intelligence app in the display 120. For example, a user may touch a speech recognition button 121*a* to the UI 121 of the intelligence app for the purpose of entering a voice 120*b* in a state where the UI 121 of the intelligence app is displayed in the display 120. For another example, the user may continuously press the hardware key 112 to enter the voice 120*b*.

According to an embodiment, the user terminal 100 may execute the intelligence app for recognizing a voice through a microphone 111. For example, in the case where a specified voice (e.g., wake up!) is entered 120*a* through the microphone 111, the user terminal 100 may display the UI 121 of the intelligence app in the display 120.

Figure 4:
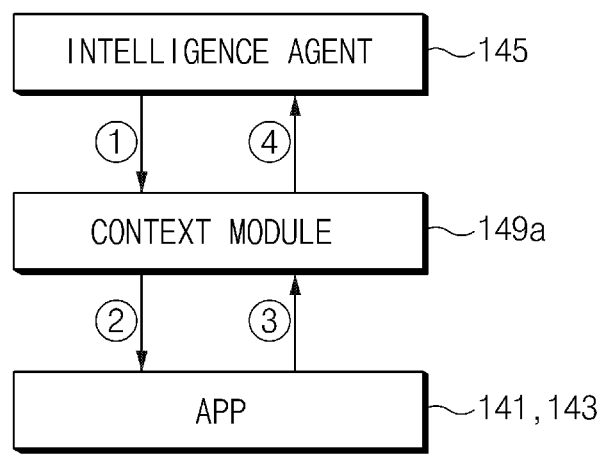
FIG. 4 is a block diagram illustrating that a context module of a processor collects a current state according to an embodiment of the disclosure.

FIG. 4 is a block diagram illustrating that a context module of a processor collects a current state according to an embodiment of the disclosure.

Referring to FIG. 4, ① when receiving a context request from the intelligence agent 145, ② the processor 150 may make a request for context information indicating current states of the apps 141 and 143 via the context module 149*a*. According to an embodiment, ③ the processor 150 may receive the context information from the apps 141 and 143 and ④ may transmit the context information to the intelligence agent 145 via the context module 149*a*.

According to an embodiment, the processor may receive pieces of context information from the apps 141 and 143 via the context module 149*a*. For example, the context information may be information about the most recently executed apps 141 and 143. For another example, the context information may be information (e.g., information about the corresponding picture in the case where a user watches a picture through a gallery app) about the current states in the apps 141 and 143.

According to an embodiment, the processor 150 may receive context information indicating a current state of the user terminal 100 from a device platform as well as the apps 141 and 143 via the context module 149*a*. The context information may include general context information, user context information, or device context information.

The general context information may include general information of the user terminal 100. The general context information may be verified through an internal algorithm by receiving data through a sensor hub of the device platform or the like. For example, the general context information may include information about current time and space. For example, the information about the current time and space may include information about current time or a current location of the user terminal 100. The current time may be verified through the time on the user terminal 100, and the information about the current location may be verified through a global positioning system (GPS). For another example, the general context information may include information about physical motion. For example, the information about the physical motion may include information about walking, running, driving, or the like. The information about the physical motion may be verified through a motion sensor. In the case of the information about driving, the boarding and the parking may be verified by sensing Bluetooth connection in a vehicle as well as the driving is verified through the motion sensor. For another example, the general context information may include user activity information. For example, the user activity information may include information about commuting, shopping, travel, or the like. The user activity information may be verified by using information about a place where a user or an app registers in a database.

The user context information may include information about the user. For example, the user context information may include information about an emotional state of the user. For example, the information about the emotional state of the user may include information about happiness, sadness, anger, or the like of the user. For another example, the user context information may include information about the current state of the user. For example, the information about the current state of the user may include information about interest, intent, or the like (e.g., shopping).

The device context information may include information about the state of the user terminal 100. For example, the device context information may include information about a path rule that the execution manager module 147 performs. For another example, the device information may include information about a battery. For example, the information about the battery may be verified through charging and discharging states of the battery. For another example, the device information may include information about a connected device and a network. For example, the information about the connected device may be verified through a communication interface connected with the device.

Figure 5:
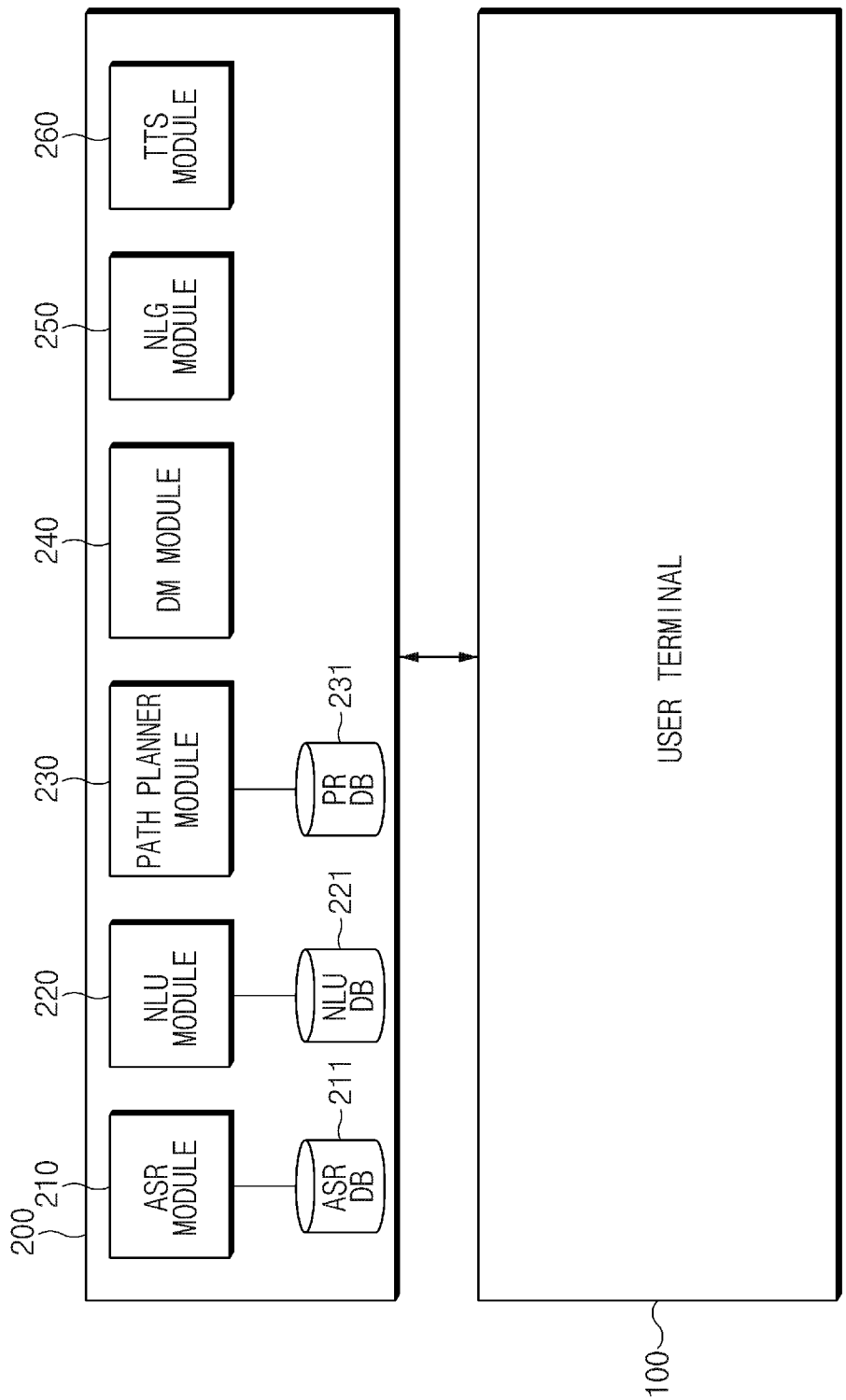
FIG. 5 is a block diagram illustrating an intelligence server of an integrated intelligent system, according to an embodiment of the present disclosure.

FIG. 5 is a block diagram illustrating an intelligence server of an integrated intelligent system, according to an embodiment of the present disclosure.

Referring to FIG. 5, the intelligence server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260. According to an embodiment, the intelligence server 200 may include a communication circuit, a memory, and a processor. The processor may execute an instruction stored in the memory to drive the ASR module 210, the NLU module 220, the path planner module 230, the DM module 240, the NLG module 250, and the TTS module 260. The intelligence server 200 may transmit or receive data (or information) to or from an external electronic device (e.g., the user terminal 100) through the communication circuit.

The NLU module 220 or the path planner module 230 of the intelligence server 200 may generate a path rule.

According to an embodiment, the ASR module 210 may convert the user input (e.g., voice data) received from the user terminal 100 to text data. For example, the ASR module 210 may include an utterance recognition module. The utterance recognition module may include an acoustic model and a language model. For example, the acoustic model may include information associated with phonation, and the language model may include unit phoneme information and information about a combination of unit phoneme information. The utterance recognition module may change user speech to text data by using the information associated with phonation and unit phoneme information. For example, the information about the acoustic model and the language model may be stored in an automatic speech recognition database (ASR DB) 211.

According to an embodiment, the NLU module 220 may grasp user intent by performing syntactic analysis or semantic analysis. The syntactic analysis may divide the user input into syntactic units (e.g., words, phrases, morphemes, and the like) and determine which syntactic elements the divided units have. The semantic analysis may be performed by using semantic matching, rule matching, formula matching, or the like. As such, the NLU module 220 may obtain a domain, intent, or a parameter (or a slot) utilized for the user input to express the intent.

According to an embodiment, the NLU module 220 may determine the intent of the user and parameter by using a matching rule that is divided into a domain, intent, and a parameter (or a slot) utilized to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more parameters. The matching rule may be stored in a natural language understanding database (NLU DB) 221.

According to an embodiment, the NLU module 220 may grasp the meaning of words extracted from a user input by using linguistic features (e.g., grammatical elements) such as morphemes, phrases, and the like and may match the meaning of the grasped words to the domain and intent to determine user intent. For example, the NLU module 220 may calculate how many words extracted from the user input is included in each of the domain and the intent, for the purpose of determining the user intent. According to an embodiment, the NLU module 220 may determine a parameter of the user input by using the words, which are the basis for grasping the intent. According to an embodiment, the NLU module 220 may determine the user intent by using the NLU DB 221 storing the linguistic features for grasping the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a path rule based on the intent of the user input and the parameter. For example, the NLU module 220 may select an app to be executed, based on the intent of the user input and may determine an action to be executed, in the selected app. The NLU module 220 may determine the parameter corresponding to the determined action to generate the path rule. According to an embodiment, the path rule generated by the NLU module 220 may include information about the app to be executed, the action (e.g., at least one or more states) to be executed in the app, and a parameter utilized to execute the action.

According to an embodiment, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set to determine the path rule.

According to another embodiment, the NLU module 220 may determine the app to be executed, the action to be executed in the app, and a parameter utilized to execute the action based on the intent of the user input and the parameter for the purpose of generating one path rule or a plurality of path rules. For example, by using information of the user terminal 100, the NLU module 220 may arrange the app to be executed and the action to be executed in the app depending on the intent of the user input in the form of ontology or a graph model for the purpose of generating the path rule. For example, the generated path rule may be stored in a path rule database (PR DB) 231 through the path planner module 230. The generated path rule may be added to a path rule set of the PR DB 231.

According to an embodiment, the NLU module 220 may select at least one path rule of the generated plurality of path rules. For example, the NLU module 220 may select an optimal path rule of the plurality of path rules. For another example, in the case where a part of actions is specified based on the user utterance, the NLU module 220 may select a plurality of path rules. The NLU module 220 may determine one path rule of the plurality of path rules depending on an additional input of the user.

According to an embodiment, the NLU module 220 may transmit the path rule to the user terminal 100 in response to a request for the user input. For example, the NLU module 220 may transmit one path rule corresponding to the user input to the user terminal 100. For another example, the NLU module 220 may transmit the plurality of path rules corresponding to the user input to the user terminal 100. For example, in the case where a part of actions is specified based on the user utterance, the plurality of path rules may be generated by the NLU module 220.

According to an embodiment, the path planner module 230 may select at least one path rule of the plurality of path rules.

According to an embodiment, the path planner module 230 may transmit a path rule set including the plurality of path rules to the NLU module 220. The plurality of path rules of the path rule set may be stored in the PR DB 231 connected to the path planner module 230 in the table form. For example, the path planner module 230 may transmit a path rule set corresponding to information (e.g., OS information or app information) of the user terminal 100, which is received from the intelligence agent 145, to the NLU module 220. For example, a table stored in the PR DB 231 may be stored for each domain or for each version of the domain.

According to an embodiment, the path planner module 230 may select one path rule or the plurality of path rules from the path rule set to transmit the selected one path rule or the selected plurality of path rules to the NLU module 220. For example, the path planner module 230 may map the user intent and the parameter to the path rule set corresponding to the user terminal 100 to select one path rule or a plurality of path rules and may transmit the selected one path rule or the selected plurality of path rules to the NLU module 220.

According to an embodiment, the path planner module 230 may generate the one path rule or the plurality of path rules by using the user intent and the parameter. For example, the path planner module 230 may determine the app to be executed and the action to be executed in the app based on the user intent and the parameter for the purpose of generating the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, the DM module 240 may determine whether the user intent grasped by the NLU module 220 is definite. For example, the DM module 240 may determine whether the user intent is definite, based on whether the information of a parameter is sufficient. The DM module 240 may determine whether the parameter grasped by the NLU module 220 is sufficient to perform a task. According to an embodiment, in the case where the user intent is not clear, the DM module 240 may perform a feedback for making a request for information to the user. For example, the DM module 240 may perform a feedback for making a request for information about the parameter for grasping the user intent.

According to an embodiment, the DM module 240 may include a content provider module. In the case where the content provider module executes an action based on the intent and the parameter grasped by the NLU module 220, the content provider module may generate the result obtained by performing a task corresponding to the user input. According to an embodiment, the DM module 240 may transmit the result generated by the content provider module as the response to the user input to the user terminal 100.

According to an embodiment, the NLG module 250 may change specified information to a text form. Information changed to the text form may be a form of a natural language utterance. For example, the specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to an embodiment, the TTS module 260 may change information of the text form to information of a voice form. The TTS module 260 may receive the information of the text form from the NLG module 250, may change the information of the text form to the information of a voice form, and may transmit the information of the voice form to the user terminal 100. The user terminal 100 may output the information of the voice form to the speaker 130

According to an embodiment, the NLU module 220, the path planner module 230, and the DM module 240 may be implemented with one module. For example, the NLU module 220, the path planner module 230 and the DM module 240 may be implemented with one module, may determine the user intent and the parameter, and may generate a response (e.g., a path rule) corresponding to the determined user intent and parameter. As such, the generated response may be transmitted to the user terminal 100.

Figure 6:
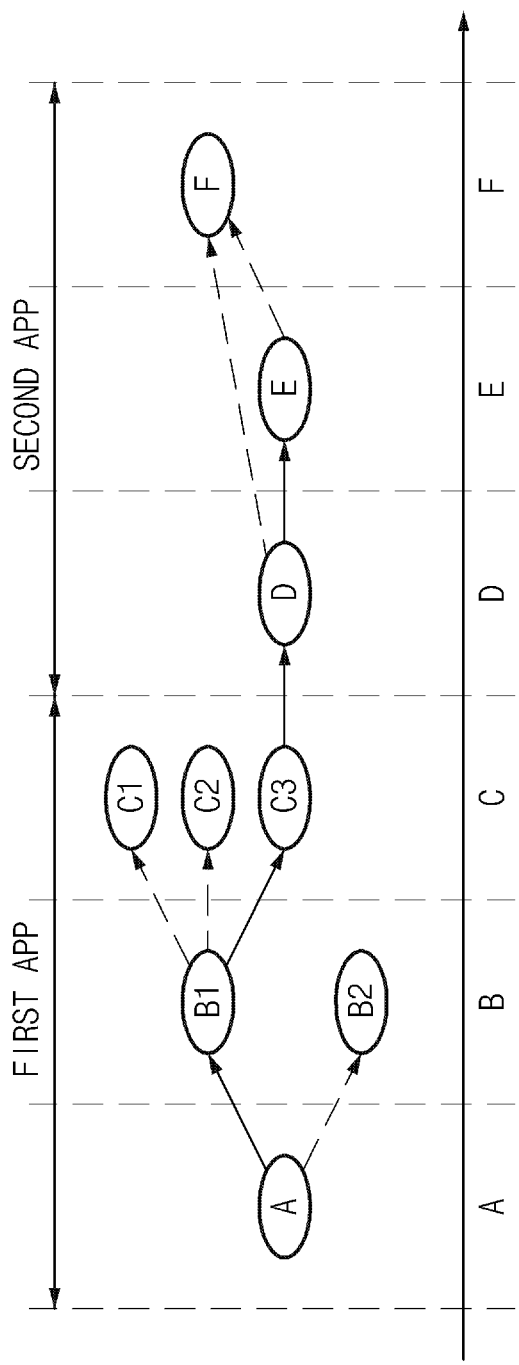
FIG. 6 is a diagram illustrating a path rule generating method of a path planner module, according to an embodiment of the present disclosure.

FIG. 6 is a diagram illustrating a path rule generating method of a path planner module, according to an embodiment of the present disclosure.

Referring to FIG. 6, according to an embodiment, the NLU module 220 may divide the function of an app into any one action (e.g., state A to state F) and may store the divided unit actions in the PR DB 231. For example, the NLU module 220 may store a path rule set including a plurality of path rules (e.g., A-B1-C1, A-B1-C2, A-B1-C3-D-F, and A-B1-C3-D-E-F) divided into the one action, in the PR DB 231.

According to an embodiment, the PR DB 231 of the path planner module 230 may store the path rule set for performing the function of an app. The path rule set may include a plurality of path rules each of which includes a plurality of actions (e.g., a sequence of states). An action executed depending on a parameter entered to each of the plurality of actions included in each of the plurality of path rules may be sequentially arranged. According to an embodiment, the plurality of path rules implemented in a form of ontology or a graph model may be stored in the PR DB 231.

According to an embodiment, the NLU module 220 may select an optimal path rule (e.g., A-B1-C3-D-F) of the plurality of path rules (e.g., A-B1-C1, A-B1-C2, A-B1-C3-D-F, and A-B1-C3-D-E-F) corresponding to the intent of a user input and the parameter.

According to an embodiment, in the case where there is no path rule completely matched to the user input, the NLU module 220 may transmit a plurality of rules to the user terminal 100. For example, the NLU module 220 may select a path rule (e.g., A-B1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may transmit the one or more path rules to the user terminal 100.

According to an embodiment, the NLU module 220 may select one of a plurality of path rules based on an input added by the user terminal 100 and may transmit the selected one path rule to the user terminal 100. For example, the NLU module 220 may select one path rule (e.g., A-B1-C3-D-F) of the plurality of path rules (e.g., A-B1-C1, A-B1-C2, A-B1-C3-D-F, and A-B1-C3-D-E-F) depending on the user input (e.g., an input for selecting C3) additionally entered by the user terminal 100 and may transmit the selected one path rule to the user terminal 100.

According to another embodiment, the NLU module 220 may determine the intent of a user and the parameter corresponding to the user input (e.g., an input for selecting C3) additionally entered by the user terminal 100 and may transmit the user intent or the parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

As such, the user terminal 100 may complete the actions of the apps 141 and 143 based on the selected one path rule.

According to an embodiment, in the case where a user input in which information is insufficient is received by the intelligence server 200, the NLU module 220 may generate a path rule partly corresponding to the received user input. For example, the NLU module 220 may transmit the partly corresponding path rule to the intelligence agent 145. The processor 150 may execute the intelligence agent 145 to receive the path rule and may transmit the partly corresponding path rule to the execution manager module 147. The processor 150 may execute the first app 141 depending on the path rule through the execution manager module 147. The processor 150 may transmit information about an insufficient parameter to the intelligence agent 145 while executing the first app 141 through the execution manager module 147. The processor 150 may make a request for an additional input to a user by using the information about the insufficient parameter, through the intelligence agent 145. When an additional input is received by a user through the intelligence agent 145, the processor 150 may transmit and process a user input to the intelligence server 200. The NLU module 220 may generate a path rule to be added, based on the intent of the user input additionally entered and parameter information and may transmit the path rule to be added, to the intelligence agent 145. The processor 150 may transmit the path rule to the execution manager module 147 through the intelligence agent 145, and may execute the second app 143 depending on the path rule through the execution manager module 147.

According to an embodiment, in the case where a user input, in which a portion of information is missed, is received by the intelligence server 200, the NLU module 220 may transmit a user information request to the personal information server 300. The personal information server 300 may transmit information of a user entering the user input stored in a persona database to the NLU module 220. The NLU module 220 may select a path rule corresponding to the user input in which a part of an action is partly missed, by using the user information. As such, even though the user input in which a portion of information is missed is received by the intelligence server 200, the NLU module 220 may make a request for the missed information to receive an additional input or may determine a path rule corresponding to the user input by using user information.

According to an embodiment, Table 1 attached below may indicate an example form of a path rule associated with a task that a user requests.

TABLE 1

| Path rule ID | State | Parameter |
|---|---|---|
| Gallery_101 | PictureView 25 | NULL |
| | Search View 26 | NULL |
| | Search ViewResult 27 | Location, time |
| | SearchEmptySelectedView 28 | NULL |
| | SearchSelected View 29 | ContentType, selectall |
| | CrossShare 30 | anaphora |

Referring to Table 1, a path rule that is generated or selected by the intelligence server 200 depending on user utterance (e.g., "please share a picture") may include at least one state 25, 26, 27, 28, 29 or 30. For example, the at least one state (e.g., one operating state of a terminal) may correspond to at least one of the picture application execution PictureView state 25, the picture search function execution SearchView state 26, the search result display screen output SearchViewResult state 27, the search result display screen output, in which a picture is non-selected, SearchEmptySelectedView state 28, the search result display screen output, in which at least one picture is selected, SearchSelectedView state 29, or the share application selection screen output CrossShare state 30.

In an embodiment, parameter information of the path rule may correspond to at least one state. For example, the selected at least one picture may be included in the SearchSelectedView state 29.

The task (e.g., "please share a picture!") that the user requests may be performed depending on the execution result of the path rule including the sequence of the states 25, 26, 27, 28, and 29.

Figure 7:
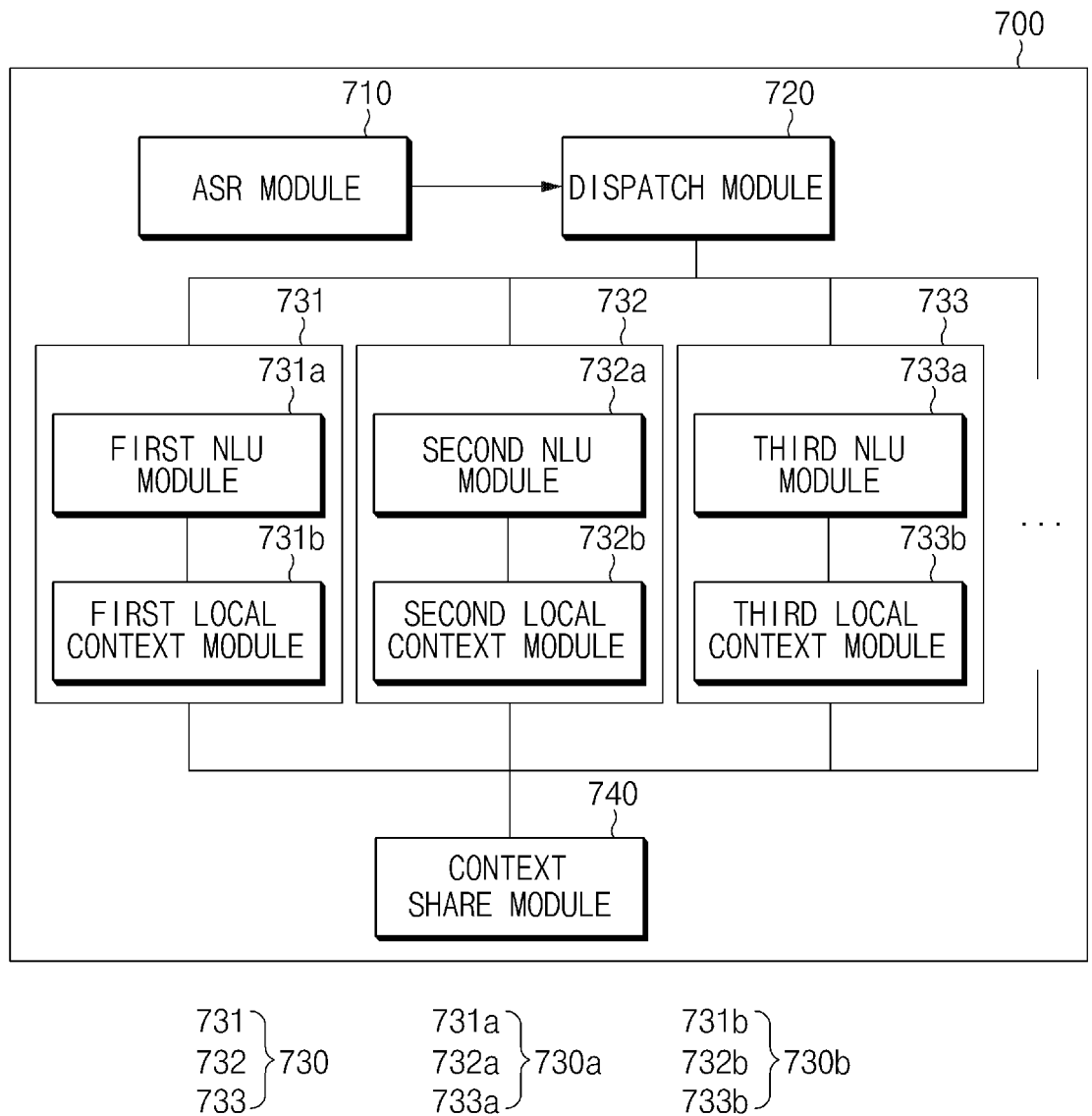
FIG. 7 is a block diagram illustrating a configuration of an intelligent system for providing context information, according to an embodiment.

FIG. 7 is a block diagram illustrating a configuration of an intelligent system for providing context information, according to an embodiment.

Referring to FIG. 7, an intelligent server (or an intelligent system) 700 may provide one or more services corresponding to one or more user utterances. For example, similarly to the intelligent server 200 of FIG. 5, the intelligent server 700 may receive a user input (e.g., a user utterance) from a user terminal and may provide the user with a specified service by replying to the user input.

According to an embodiment, the intelligent server 700 may include an auto speech recognition (ASR) module 710, a dispatch module 720, a plurality of chat-bots 730, and a context share module 740.

According to an embodiment, the intelligent server 700 may be implemented with a hardware module performing each function. According to another embodiment, the intelligent server 700 may include a communication interface (or a network interface), at least one memory, and at least one processor, which implement the functions of the intelligent server 700. The communication interface and the memory may be operatively connected to the processor. According to an embodiment, the memory may store instructions that, when executed, cause the processor to perform the functions of the intelligent server 700. The processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the intelligent server 700 may receive voice data including a user utterance from the user terminal. The user terminal may receive the user utterance and may transmit the voice data corresponding to the user utterance to the intelligent server 700.

According to an embodiment, similarly to the ASR module 510 of FIG. 5, the ASR module 710 may convert the received voice data to text data associated with the user utterance. In other words, the ASR module 710 may process the voice data to generate first text data based on the user utterance.

According to an embodiment, the dispatch module 720 may select one or more of the chatbots 731, 732, or 733 from among the plurality of chatbots 730. The selected chatbot(s) will process the converted text data. According to an embodiment, the dispatch module 720 may select the chatbot 731, 732, or 733 based on the received voice data.

For example, according to an embodiment, when the user utterance includes a specified word, such as the name of an app, the dispatch module 720 may select the chatbot 731, 732, or 733 corresponding to the name of the app. In other words, when an application name is included in the converted text data, the dispatch module 720 may select the chatbot 731, 732, or 733 corresponding to the application name.

According to an embodiment, when the user utterance does not include an application name, the dispatch module 720 may calculate a score of each of the plurality of chatbots 730 to select the chatbot 731, 732, or 733 that will process the user utterance. The highest scoring chatbot may be selected to process the converted text data. For example, the score may be calculated based on the relationship the user utterance has with the chatbot 731, 732, or 733. According to an embodiment, the dispatch module 720 may analyze the relationship between the chatbot 731, 732, or 733 and words included in the user utterance to calculate the score. For example, the dispatch module 720 may calculate the score by examining the number of words in the user utterance that are associated with the functions of the chatbots 731, 732, or 733.

According to an embodiment, each of the plurality of chatbots 730 may provide the user (or the user terminal) with a response that provides a specified service. For example, the plurality of chatbots 730 may provide the user with the response to the user utterance. According to an embodiment, the plurality of chatbots 730 may correspond to apps (or application programs) that provide the specified services. According to an embodiment, the plurality of chatbots 730 may operate an app installed in the user terminal to provide the user with the results or may provide the user with the results obtained through the Internet. According to an embodiment, the plurality of chatbots 730 may include the first chatbot 731, the second chatbot 732, and the third chatbot 733, each of which provides a different specified service. The first chatbot 731, the second chatbot 732, and the third chatbot 733 may operate independently of one another. The plurality of chatbots 730 may provide services different from each other.

According to an embodiment, the plurality of chatbots 730 may include natural language understanding (NLU) modules 731*a*, 732*a*, and 733*a*, each of which are used to provide the respective services. In other words, the intelligent server 700 may include a plurality of NLU modules 730*a* for providing the specified services. Each of the plurality of NLU modules 730*a* may be similar to the NLU module 233 of FIG. 5. According to an embodiment, the plurality of NLU modules 730*a* may each correspond to a different chatbot.

According to an embodiment, each of the plurality of NLU modules 730*a* may process a user utterance associated with its specified service. For example, the plurality of NLU modules 730*a* may process user utterances for performing various different tasks. According to an embodiment, each of the plurality of NLU modules 730*a* may process the converted text data as an intent and context information associated with the intent. In other words, the plurality of NLU modules 730*a* may generate the intent corresponding to the user utterance and context information that includes the item associated with the intent. For example, the context information may include a parameter for performing a task corresponding to a first intent.

According to an embodiment, the plurality of NLU modules 730*a* may provide the user (or the user terminal) with the response corresponding to the user utterance based on the generated intent and the generated context information.

According to an embodiment, the plurality of chatbots 730 may each respectively include local context modules 731*b*, 732*b*, and 733*b*, each of which manages the generated context information. In other words, the intelligent server 700 may include a plurality of local context modules 730*b* for managing the generated context information.

According to an embodiment, the plurality of local context modules 730*b* may store the generated context information in a database. For example, the plurality of local context modules 730*b* may store the generated context information in the specified format.

According to an embodiment, the plurality of local context modules 730*b* may share the generated context information with the other chatbots. For example, the plurality of local context modules 730*b* may share context information capable of being used by other chatbots. According to an embodiment, the plurality of local context modules 730*b* may share the generated context information with the other chatbots through the context share module 740. The plurality of local context modules 730*b* may transmit the generated context information to the context share module 740 to share the generated context information.

According to an embodiment, the first chatbot 731 may include the first NLU module 731*a* and the first local context module 731*b*. According to an embodiment, the first NLU module 731*a* may provide the user with responses for providing hotel reservation service. For example, the first NLU module 731*a* may generate a first intent (e.g., hotel reservation) from a first user input (e.g., "please make a reservation for Osaka Hotel from September 7th to September 10th!") associated with hotel reservation. The first NLU module 731*a* may further generate first context information (e.g., Osaka, from September 7th to September 10th) associated with the first intent and may provide the user with a first response (e.g., information about a hotel capable of being booked) based on the first intent and the first context information. According to an embodiment, the first local context module 731*b* may store the first context information. According to an embodiment, the first local context module 731*b* may transmit the first context information to the context share module 740. For example, the first context information may be shared with the other chatbot 732 or 733 as information about a location and a period in time.

According to an embodiment, the second chatbot 732 may include the second NLU module 732*a* and the second local context module 732*b*. According to an embodiment, the second NLU module 732*a* may provide the user with responses for providing car rental reservation service. For example, the second NLU module 732*a* may generate a second intent (e.g., car rental reservation) from a second user input (e.g., "please make a reservation for a rent car in Osaka from September 7th to September 10th!") associated with car rental reservation. The second NLU module 732*a* may further generate second context information (e.g., Osaka, from September 7th to September 10th) associated with the second intent and may provide the user with a second response (e.g., information about car rental capable of being booked) based on the intent and the context information. According to an embodiment, the second local context module 732b may store the second context information. According to an embodiment, the second local context module 732b may transmit the second context information to the context share module 740. For example, the second context information may be shared with the other chatbot 731 or 733 as information about a location and a period in time.

According to an embodiment, the third chatbot 733 may include the third NLU module 733a and the third local context module 733b. According to an embodiment, the third NLU module 733a may provide the user with responses for providing food delivery service. For example, the third NLU module 733a may generate a third intent (e.g., food delivery) from a third user input (e.g., "please place an order for one supreme pizza at Methane 3-dong 213") associated with food delivery. The third NLU module 733a may further generate third context information (e.g., Methane 3-dong 213, supreme pizza) associated with the third intent and may provide the user with a third response (e.g., order information) based on the third intent and the third context information. According to an embodiment, the third local context module 733b may store the third context information. According to an embodiment, the third local context module 733b may transmit the third context information to the context share module 740. For example, the third context information may be shared with the other chatbot 731 or 732 as information about an address and a menu.

According to an embodiment, the context share module 740 may receive context information generated by the plurality of chatbots 730. For example, the context share module 740 may receive context information from the plurality of local context modules 730b. The context information received by the context share module 740 may be restricted to only context information that can be used by other chatbots. According to an embodiment, the context share module 740 may store the received information in a database. According to an embodiment, the context share module 740 may transmit the stored context information to the other chatbots. As such, the plurality of chatbots 730 may share the context information with each other.

Figure 8A:
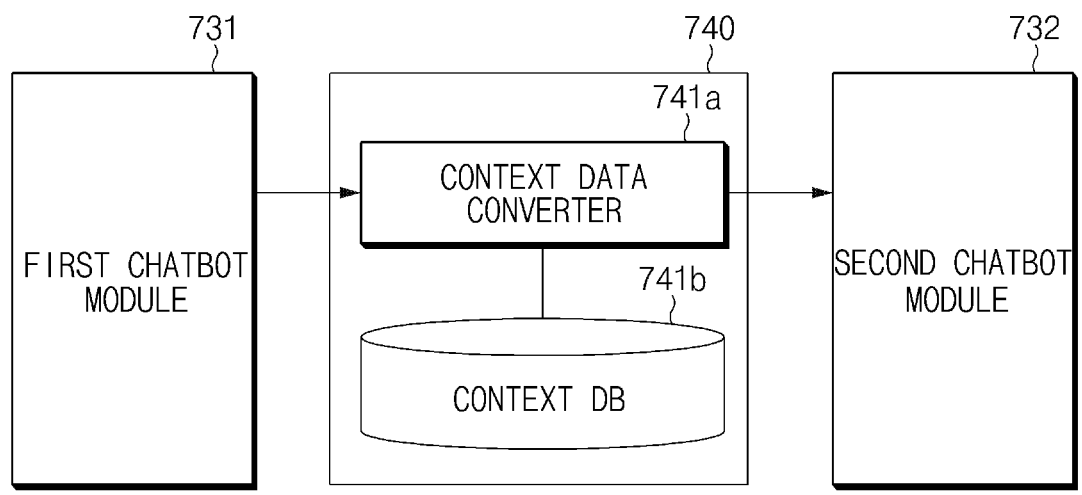
FIG. 8A is a block diagram illustrating a configuration of a context share module that converts context information in different formats in order to share the context information to a plurality of chatbots, according to an embodiment.

FIG. 8A is a block diagram illustrating a configuration of a context share module that converts context information in different formats in order to share the context information to a plurality of chatbots, according to an embodiment.

Referring to FIG. 8A, the context share module 740 may store context information (or an item included in the context information) in a specified format in order to share the context information between the first chatbot 731 and the second chatbot 732. According to an embodiment, the context share module 740 may include a context data converter 741a and a context database (DB) 741b.

According to an embodiment, the context data converter 741a may convert the context information received from the first chatbot 731 to the specified format. For example, the context data converter 741a may set at least one field (e.g., a user's name field or a user's address field) and may convert the received context depending using the field. In other words, the specified format may be defined as at least one field. According to an embodiment, the context data converter 741a may store the converted context information in the context DB 741b. For example, the context share module 740 may store context information, which is converted by the context data converter 741a, in the context DB 741b.

According to an embodiment, the context data converter 741a may reconvert the context information, which is stored in the specified format, to a format necessary for the second chatbot 732. For example, the context data converter 741a may extract data/parameter from a field it set (e.g., an address field), which includes information necessary for the second chatbot 732, from among at least one field of the context information stored in the specified format. According to an embodiment, the context data converter 741a may transmit the reconverted or extracted context information the second chatbot 732.

According to an embodiment, the context data converter 741a may convert the context information in different formats depending on the purpose of the user utterance to store the converted context information in the context DB 741b. For example, the context data converter 741a may set different fields depending on the purpose (e.g., hotel reservation, food order, or the like) of the user utterance to store the received context information in the context DB 741b.

As such, the context share module 740 may share the context information stored in different formats to the plurality of chatbots 730.

Figure 8B:
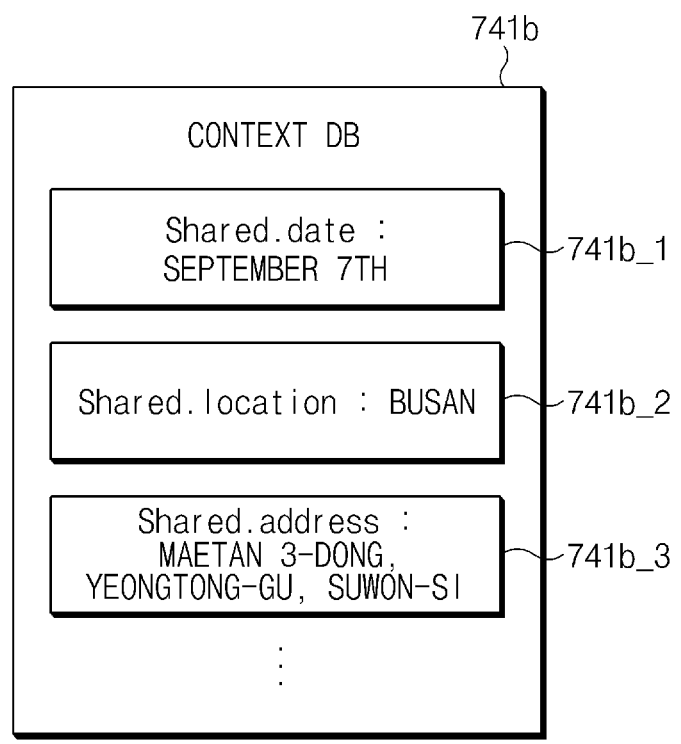
FIG. 8B is a block diagram illustrating a format of information stored in a context share module, according to an embodiment.

FIG. 8B is a block diagram illustrating a specified format of information stored in a context share module, according to an embodiment.

Referring to FIG. 8B, the context share module 740 may store context information (or an item included in the context information) transmitted between the plurality of chatbots 730 in a specified format. The context share module 740 may store the context information in the context DB 741b.

According to an embodiment, the context share module 740 may store the context information in at least one field in the context DB 741b. For example, the context share module 740 may define a field depending on the content of the stored information and may store the context information in the defined field in the context DB 741b. For example, when the context information 741b_1 includes content associated with a date, the context share module 740 may define the field as "shared.date" and may store the content of "September 7th" in the defined field. In another example, when the context information 741b_2 includes content associated with a location, the context share module 740 may define the field as "shared.location" and may store "Busan" in the defined field. In yet another example, when the context information 741b_3 includes content associated with an address, the context share module 740 may define the field as "shared.address" and may store "maetan 3-dong, Yeongtong-gu, Suwon-si" in the defined field.

Figure 9:
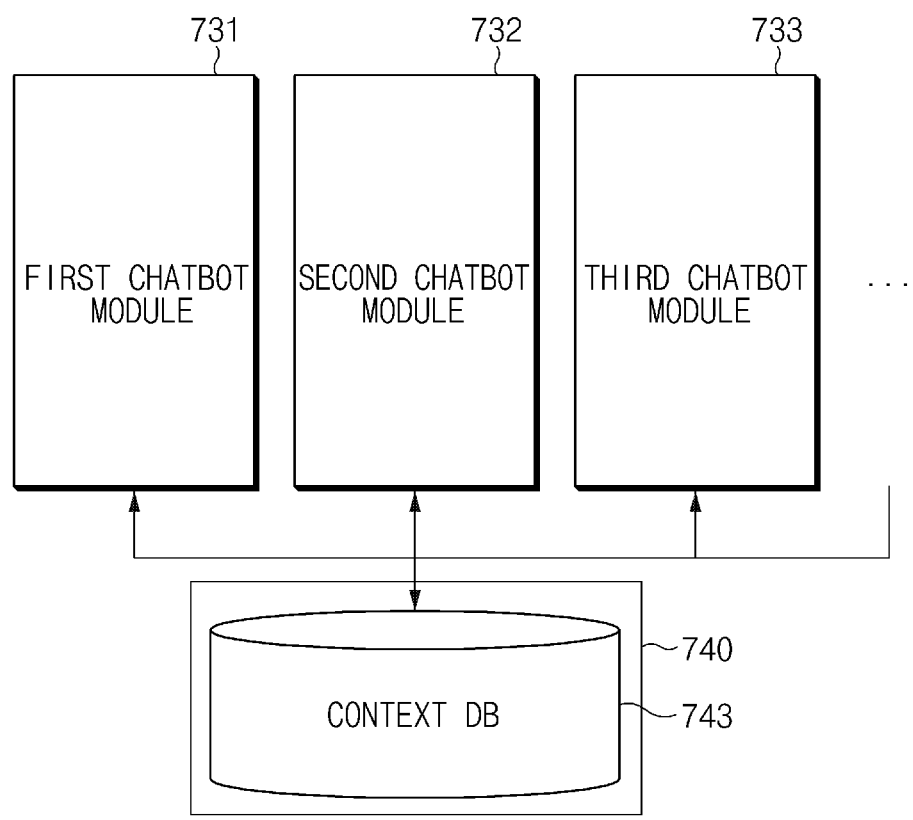
FIG. 9 is a block diagram illustrating a configuration of a context share module that allows a plurality of chatbots to share context information in specified formats, according to an embodiment.

FIG. 9 is a block diagram illustrating a configuration of a context share module that allows a plurality of chatbots to share context information in specified formats, according to an embodiment.

Referring to FIG. 9, the first chatbot 731, the second chatbot 732, and the third chatbot 733 may share context information (or an item included in the context information) in specified formats. According to an embodiment, the context share module 740 may include a context DB 743.

According to an embodiment, the first chatbot 731, the second chatbot 732, and the third chatbot 733 may generate context information in various specified formats. For example, one specified format may be a format indicating various attributes of the context information (e.g., Shared.date: from September 7th to 10th, Shared.address: maetan 3-dong 343).

According to an embodiment, the first chatbot 731, the second chatbot 732, and the third chatbot 733 may store the context information in the specified formats in the context DB 743. According to an embodiment, the first chatbot 731, the second chatbot 732, and the third chatbot 733 may obtain the context information in the specified formats from the context DB 743. According to an embodiment, the first chatbot 731, the second chatbot 732, and the third chatbot 733 may share the context information through the context DB 743, without changing the formats of the context information.

As such, the first chatbot 731, the second chatbot 732, and the third chatbot 733 may store (or update) the context information in the specified formats in the context share module 740 at various points in time, and may obtain the context information in the specified formats from the context share module 740.

Figure 10:
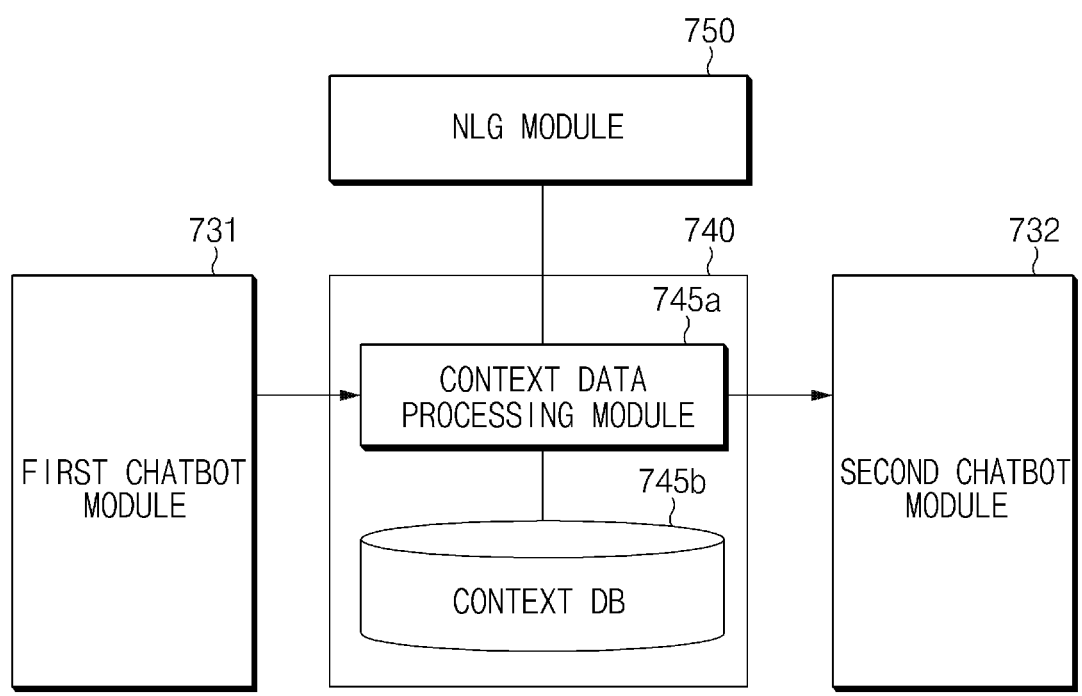
FIG. 10 is a block diagram illustrating a configuration of a context share module that allows a plurality of chatbots to convert context information into voice data and to share context information, according to an embodiment.

FIG. 10 is a block diagram illustrating a configuration of a context share module that allows a plurality of chatbots to convert context information into voice data and to share context information, according to an embodiment.

Referring to FIG. 10, the context share module 740 may convert context information (or an item included in the context information) to voice data (e.g. natural language) to share context information between the first chatbot 731 and the second chatbot 732. According to an embodiment, the context share module 740 may include a context data processing module 745*a* and a context DB 745*b*.

According to an embodiment, the context data processing module 745*a* may receive context information generated from the first chatbot 731 and may store the received context information in the context DB 745*b*. For example, the context data processing module 745*a* may store the received context information in the context DB 745*b*, without converting the received context information into a specified format.

According to an embodiment, the context data processing module 745*a* may convert the stored context information into voice data. For example, the context data processing module 745*a* may convert the stored context information into the voice data through a natural language generator (NLG) module (or a NLG module) 750 similar to the NLG module 250 of FIG. 5. According to an embodiment, the context data processing module 745*a* may transmit the converted voice data to the second chatbot 732. According to an embodiment, the second chatbot 732 may process the transmitted voice data through an ASR module (e.g., the ASR module 710 of FIG. 7) and an NLU module (e.g., the second NLU module 732*a* of FIG. 7).

As such, the context share module 740 may employ an existing module of the intelligent server 700 to share context information between the plurality of chatbots 730, without requiring a separate new module for converting the context information in the specified formats.

Figure 11A:
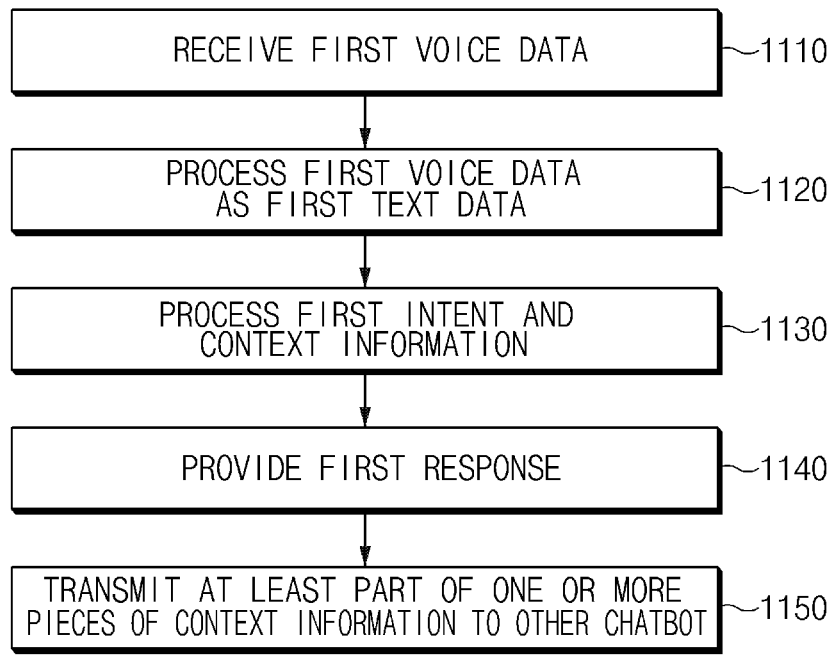
FIG. 11A is a flowchart illustrating a method in which an intelligent server shares context information, according to an embodiment.
Figure 11B:
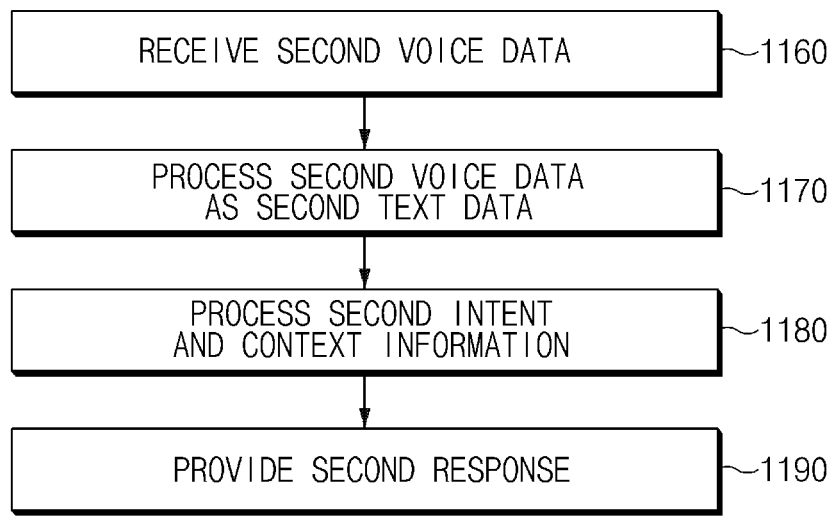
FIG. 11B is a flowchart illustrating a method in which an intelligent server shares context information, according to an embodiment.

FIGS. 11A and 11B are flowcharts illustrating a method in which an intelligent server shares context information, according to an embodiment.

Referring to FIG. 11A, the intelligent server 700 may transmit context information generated by one of the plurality of chatbots 730 to one of the other chatbots. A method 1101 of transmitting the context information to one of the other chatbots may include operation 1110 to operation 1150.

According to an embodiment, in operation 1110, the intelligent server 700 (e.g., the plurality of chatbots 730) may receive first voice data including a first user utterance. For example, the intelligent server 700 may receive the first voice data via a communication interface.

According to an embodiment, in operation 1120, the intelligent server 700 may process the first voice data (i.e. the first user utterance) into first text data.

According to an embodiment, in operation 1130, the intelligent server 700 may process the first text data into a first intent, and one or more pieces of context information associated with the first intent, using the first chatbot 731 of the plurality of chatbots 730.

According to an embodiment, in operation 1140, the intelligent server 700 may provide a first response based on the first intent and the one or more pieces of context information. For example, the intelligent server 700 may provide the first response via the communication interface.

According to an embodiment, in operation 1150, the intelligent server 700 may transmit at least part of the one or more pieces of context information to the other chatbots. For example, in the case where the one or more pieces of context information were generated by the first chatbot 731, the context information may be transmitted to the other chatbots 732 or 733. The intelligent server 700 may transmit at least part of the one or more pieces of context information to the other chatbots via the context share module 740.

Referring to FIG. 11B, the intelligent server 700 may process a user utterance by using the context information transmitted from one of the other chatbots, for example the second chatbot 732. A method 1103 for processing the context information may include operation 1160 to operation 1190.

According to an embodiment, in operation 1160, the intelligent server 700 (e.g., the plurality of chatbots 730) may receive second voice data including a second user utterance. For example, the intelligent server 700 may receive the second voice data via the communication interface.

According to an embodiment, in operation 1170, the intelligent server 700 may process the second voice data (i.e. the second user utterance) into second text data.

According to an embodiment, in operation 1180, the intelligent server 700 may process the second text data into a second intent, using the second chatbot 732 of the plurality of chatbots 730. For example, the intelligent server 700 may process the second text data into the second intent, using the second NLU module 732*a* of the plurality of NLU modules 730*a*.

According to an embodiment, in operation 1190, the intelligent server 700 may provide a second response based on the second intent and the one or more pieces of context information transmitted from the other chatbot 731. For example, the intelligent server 700 may provide the second response via the communication interface.

Figure 12:
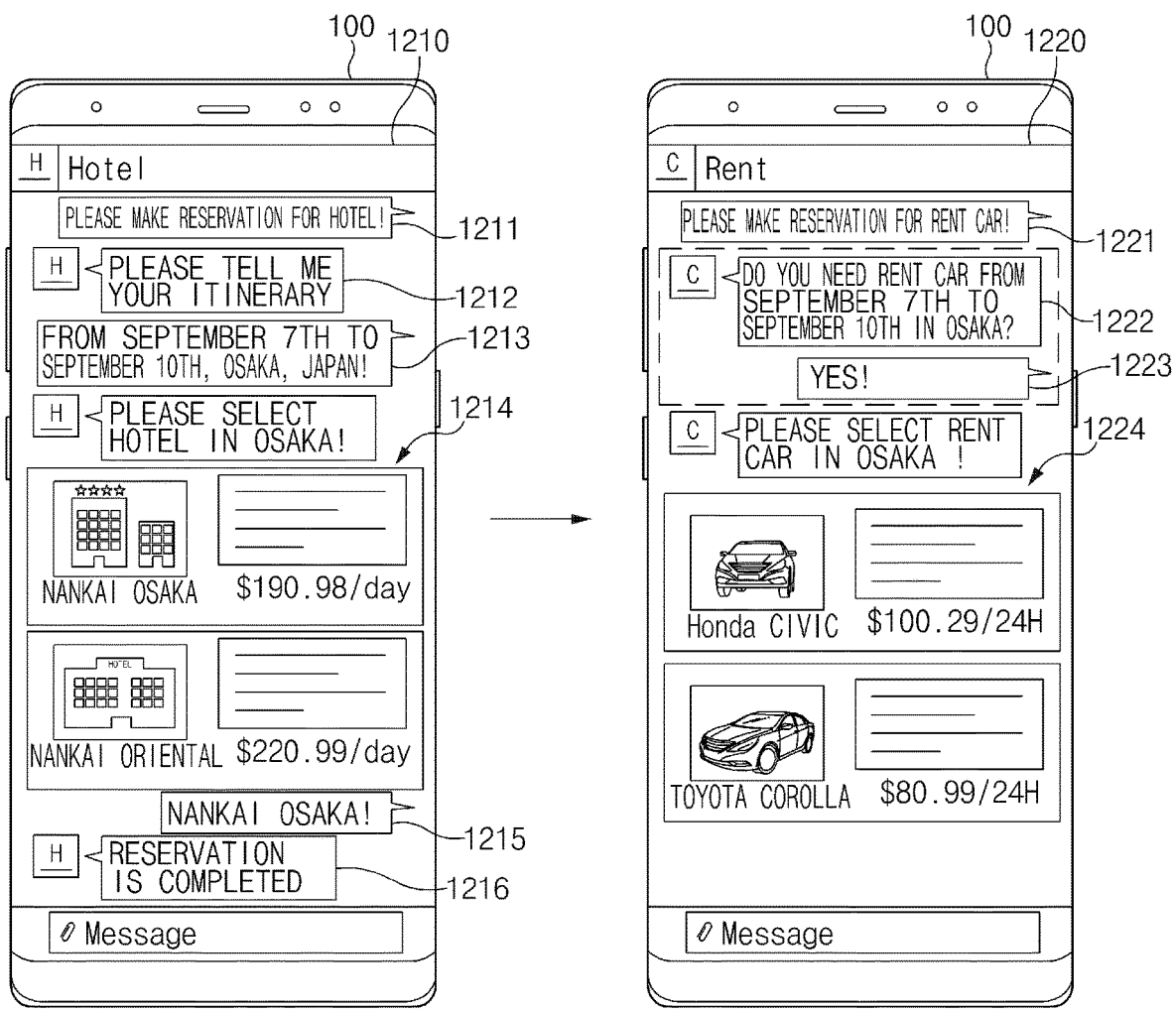
FIG. 12 are views illustrating screens in which an intelligent server provides a user with a plurality of services according to a user input, according to an embodiment.

FIG. 12 are views illustrating screens in which an intelligent server provides a user with a plurality of services according to a user input, according to an embodiment.

Referring to FIG. 12, the plurality of chatbots 730 of the intelligent server 700 may share context information to provide the user (or the user terminal shown in FIG. 12) with a plurality of services.

According to an embodiment, in screen 1210, the user terminal 100 may provide the user with a service for hotel reservation through the first chatbot 731 of the intelligent server 700.

According to an embodiment, the user terminal 100 may execute a first app (e.g., Hotel app) corresponding to the first chatbot 731 so that the user may interact with the first chatbot 731 to reserve a hotel. For example, the interaction may include a user input and a response to the user input. According to an embodiment, the user terminal 100 may display the user interface (UI) of the first app on a display and may display the interaction on the UI. For example, the user terminal 100 may display the user input and the response as a chat.

According to an embodiment, the user terminal 100 may receive a user utterance 1211 saying that "please make a reservation for a hotel!" The user terminal 100 may receive a response 1212 saying that "please tell me your itinerary." for obtaining the hotel reservation information, from the intelligent server 700.

According to an embodiment, the user terminal 100 may receive another user utterance 1213 saying that "from September 7th to September 10th, in Osaka, Japan!" The intelligent server 700 may process the user utterances 1211 and 1213 into a first intent (e.g., hotel reservation) and context information (e.g., Osaka, from September 7th to September 10th). According to an embodiment, the intelligent server 700 may obtain information about hotels capable of being booked, based on the first intent and the context information and may transmit the obtained information to the user terminal 100. The user terminal 100 may receive a response 1214 including the information about the hotels capable of being booked from the intelligent server 700.

According to an embodiment, the intelligent server 700 may determine that the context information is information capable of being used by one other chatbot (e.g., the second chatbot 732) and may store the context information in a database (e.g., the context databases 741*b*, 743, and 745*b* of FIGS. 8 to 10) so as to share the context information between the plurality of chatbots 730.

According to an embodiment, the user terminal 100 may receive yet another user utterance 1215 saying that "Nankai Osaka!" for selecting a desired hotel. The intelligent server 700 may make a reservation for the hotel corresponding to the user utterance 1215. The user terminal 100 may receive a response 1216 from the intelligent server 700 notifying the user that the hotel reservation is completed.

According to an embodiment, in screen 1220, the user terminal 100 may provide the user with a service for car rental reservation through the second chatbot 732 of the intelligent server 700.

According to an embodiment, the user terminal 100 may execute a second app (e.g., Rental app) corresponding to the second chatbot 732 so that the user may interact with the second chatbot 732 to rent a car. According to an embodiment, the user terminal 100 may display the UI of the second app on the display and may display the interaction on the UI.

According to an embodiment, the user terminal 100 may receive a user utterance 1221 saying that "please make a reservation for a rent car!" The intelligent server 700 may process the user utterance 1221 into a second intent (e.g., car rental reservation).

According to an embodiment, the intelligent server 700 may transmit the context information (e.g., Osaka, from September 7th to September 10th) generated by the first chatbot, to the second chatbot to perform a task according to the second intent. For example, the intelligent server 700 may transmit the context information stored in a database to the second chatbot. According to an embodiment, the user terminal 100 may receive a response 1222 saying that "Do you need a rent car from September 7th to September 10th in Osaka?" for verifying the transmitted context information. According to an embodiment, the user terminal 100 may receive another user utterance 1223 of "Yes!" verifying the context information. According to an embodiment, the intelligent server 700 may obtain information about available car rentals by using the second intent and the context information and may transmit the obtained information to the user terminal 100. The user terminal 100 may receive information 1224 about available car rentals from the intelligent server 700.

When the intelligent server 700 provides the user (or the user terminal 100) with a plurality of services, the intelligent server 700 may share context information relevant to multiple services, thereby preventing the redundant interactions between the user, the user terminal 100, and the intelligent server 700.

Figure 13:
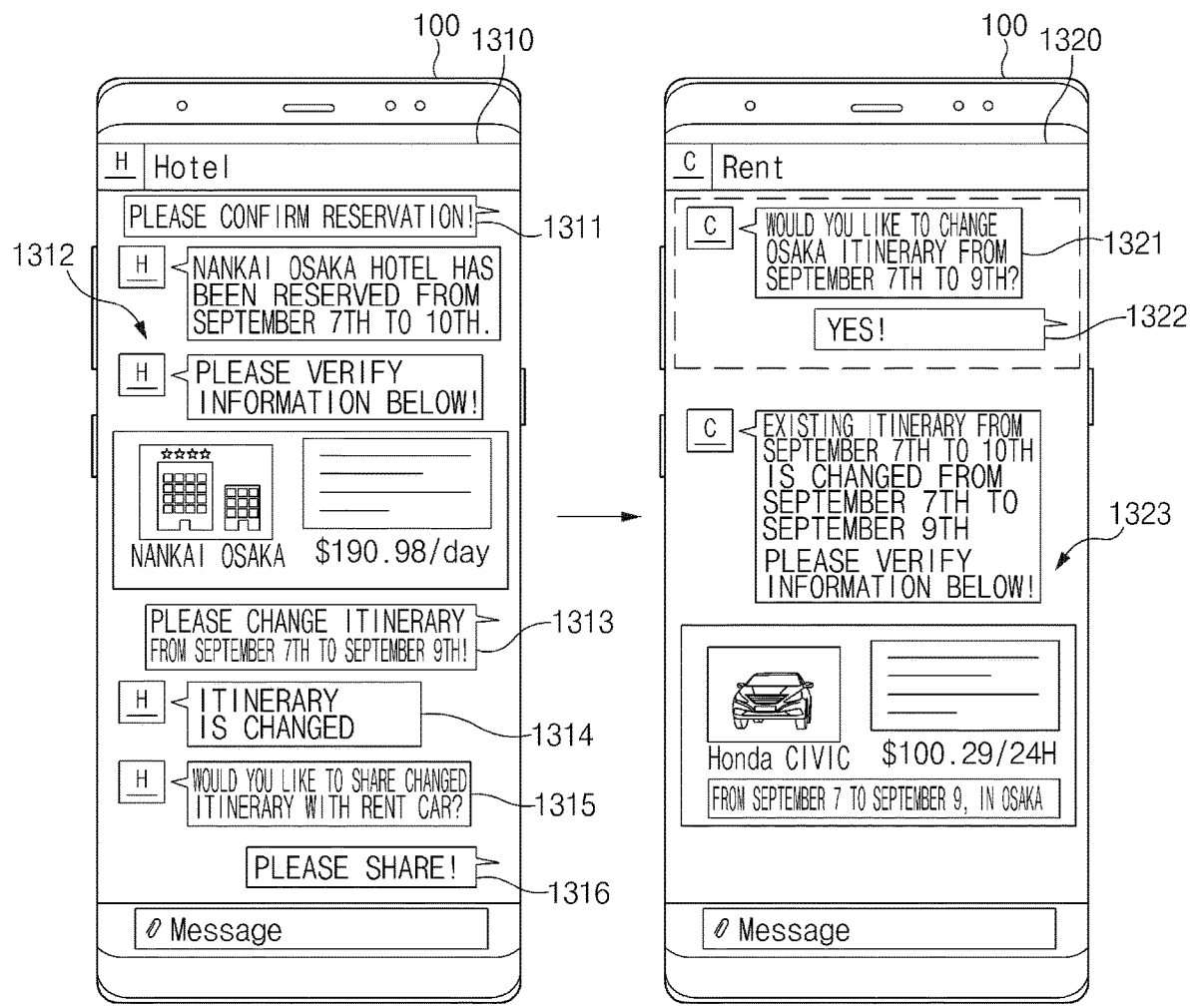
FIG. 13 are views illustrating screens in which an intelligent server changes the content of a plurality of services provided depending on a user input, according to an embodiment.

FIG. 13 are views illustrating screens in which an intelligent server changes the content of a plurality of services provided depending on a user input, according to an embodiment.

Referring to FIG. 13, the intelligent server 700 may change the content of a plurality of services that share context information.

According to an embodiment, in screen 1310, the user terminal 100 may change reservation information of a hotel through the first chatbot 731 of the intelligent server 700.

According to an embodiment, the user terminal 100 may execute a first app (e.g., Hotel app) corresponding to the first chatbot 731 so that the user may interact with the first chatbot 731 to reserve a hotel. According to an embodiment, the user terminal 100 may display the UI of the first app on a display and may display the interaction on the UI.

According to an embodiment, the user terminal 100 may receive a user utterance 1311 saying that "please confirm the hotel reservation!" The user terminal 100 may receive a response 1312 showing the hotel reservation information.

According to an embodiment, the user terminal 100 may receive another user utterance 1313 saying that "please change an itinerary from September 7th to September 9th!" The intelligent server 700 may change hotel reservation information, using an intent (e.g., hotel reservation change) and the context information (e.g., from September 7th to September 9th), which are extracted from the user utterance 1313. The user terminal 100 may receive a response 1314 showing the change.

According to an embodiment, the user terminal 100 may receive a response 1315 for determining whether to change reservation information of the car rental providing the car rental reservation service by using the same context information (e.g., Osaka, from September 7th to September 9th). The user terminal 100 may receive a user utterance 1316 "please share!" for changing the car rental reservation information. According to an embodiment, the intelligent server 700 may determine that the context information is information to be used in the second chatbot 732 (e.g. because context information was previously shared between the first chatbot 731 and second chatbot 732 for the hotel and car rental reservations), and may store the context information in a database so as to share the context information between the first chatbot 731 and the second chatbot 732.

According to an embodiment, in screen 1320, the user terminal 100 may change the car rental reservation information through the second chatbot of the intelligent server 700.

According to an embodiment, the user terminal 100 may execute a second app (e.g., Rental app) corresponding to the second chatbot 732 so that the user may interact with the second chatbot 732 to change the car rental reservation. According to an embodiment, the user terminal 100 may display the UI of the second app on the display and may display the interaction on the UI.

According to an embodiment, the intelligent server 700 may transmit context information (e.g., from September 7th to September 9th) generated by the first chatbot, to the second chatbot to perform the change in the car rental reservation. For example, the intelligent server 700 may transmit the context information stored in a database to the second chatbot. According to an embodiment, the user terminal 100 may receive a response 1321 saying that "Do you want to change the Osaka itinerary from September 7th to September 9th?" for verifying the transmitted context information. According to an embodiment, the user terminal 100 may receive a user utterance 1322 of "Yes!" for verifying the context information. According to an embodiment, the intelligent server 700 may change the car rental reservation information using the context information. According to an embodiment, the user terminal 100 may receive a response 1323 for providing the changed reservation information.

As such, when the intelligent server 700 changes information between a plurality of services that share context information, redundant interactions between the user, the user terminal 100, and the intelligent server 700 may be prevented.

Figure 14:
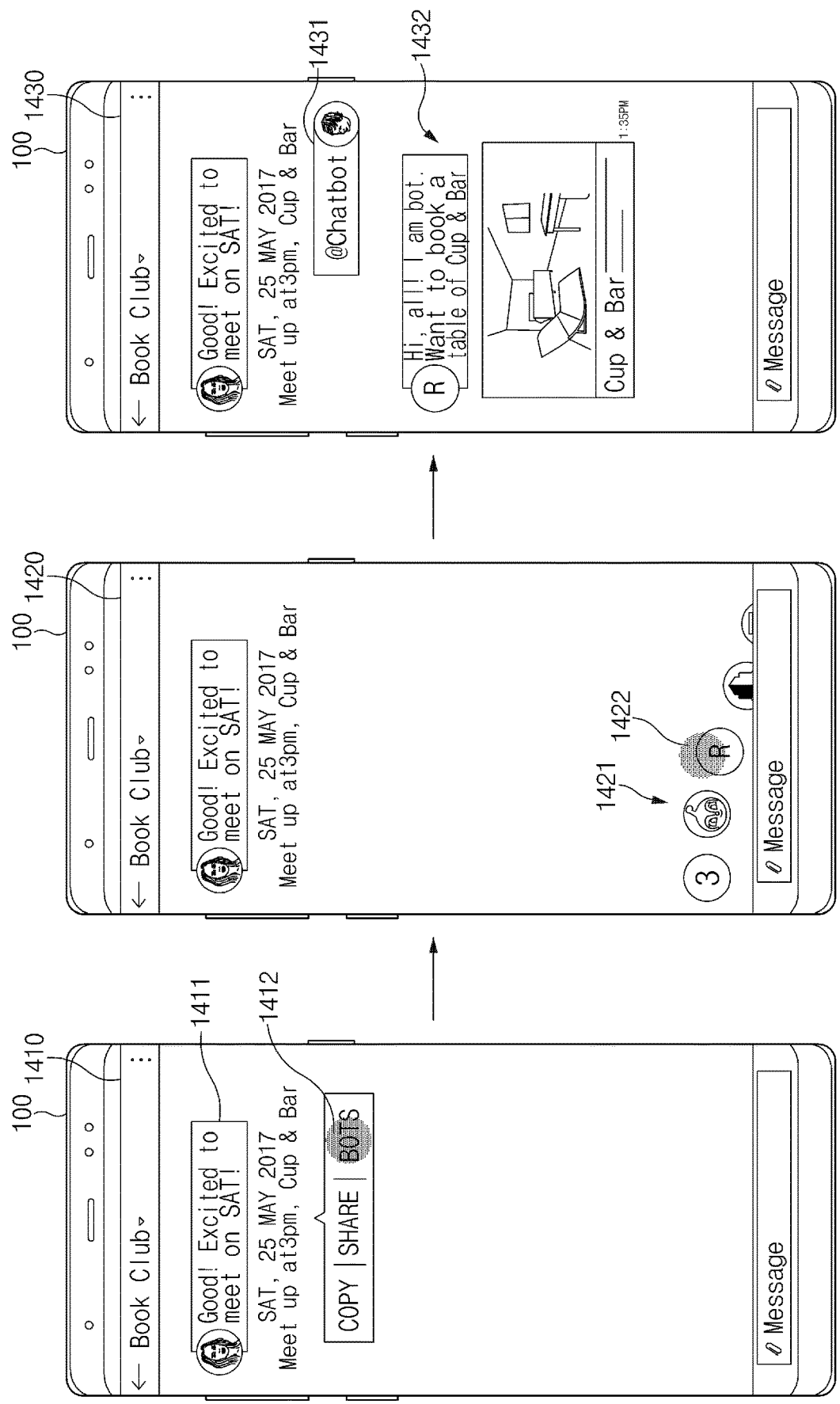
FIG. 14 are views illustrating screens in which an intelligent server provides a specified service depending on a user input, according to an embodiment.

FIG. 14 are views illustrating screens in which an intelligent server provides a specified service depending on a user input, according to an embodiment.

Referring to FIG. 14, the intelligent server 700 may share context information selected by a user with the chatbots 731, 732, or 733 to provide a specified service.

According to an embodiment, the user terminal 100 may execute a third app (e.g., a message app) for transmitting or receiving messages. For example, the third app may include chatbots providing services of the intelligent server 700. According to an embodiment, the chatbots may generate context information.

According to an embodiment, in screen 1410, the user terminal 100 may receive a message 1411 from a counterparty that includes a meeting time. According to an embodiment, the user terminal 100 may receive a user input 1412 for selecting context information associated with the meeting (e.g., SAT, 25th MAY, 3 pm, Cup & Bar) that is generated from the received message 1411 and other previous messages (not shown). According to an embodiment, a chatbot providing a message service of the intelligent server 700 may generate the context information. According to an embodiment, the intelligent server 700 may determine that the context information is information capable of being used by one other chatbot (e.g., a chatbot providing restaurant reservation service) and may store the context information in a database so as to share the context information between the plurality of chatbots 730.

According to an embodiment, in screen 1420, the user terminal 100 may provide the user with at least one app 1421 for using the selected context information. For example, the user terminal 100 may display information about the at least one app 1421 in the display. The at least one app 1421 may be an app capable of processing the context information. According to an embodiment, an intelligent server (e.g., the intelligent server 700 of FIG. 7) may transmit information about at least one NLU module, which is selected based on the context information, from among a plurality of NLU modules, to the user terminal 100. The at least one NLU module may correspond to the at least one app 1421. According to an embodiment, the user terminal 100 may receive a user input 1422 to select one of at least one app 1421. For example, the user input may be an input to select an app that provides restaurant reservation service.

According to an embodiment, in screen 1430, the user terminal 100 may perform an interaction 1431 with a chatbot corresponding to the selected app. According to an embodiment, the intelligent server 700 may transmit the context information (e.g., SAT, 25th MAY, 3 pm, Cup & Bar) generated by the chatbot providing the message service, to the chatbot providing the restaurant reservation service. According to an embodiment, the intelligent server 700 may provide a response corresponding to the interaction 1431 by using the selected one NLU module. For example, the intelligent server 700 may transmit reservation information of a restaurant to the user terminal 100. According to an embodiment, the user terminal 100 may receive reservation information 1432 of the restaurant.

Figure 15:
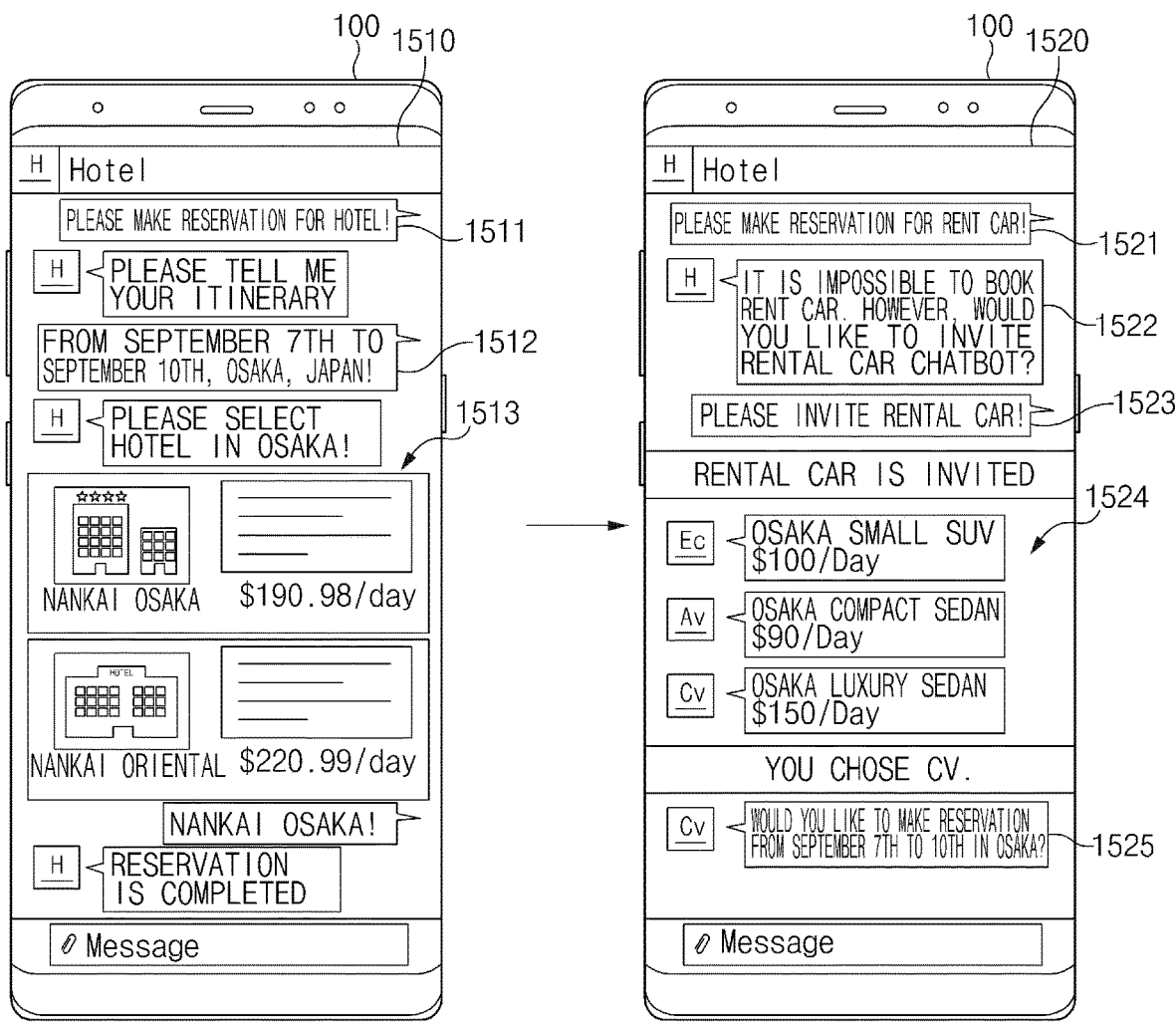
FIG. 15 are views illustrating screens in which an intelligent server determines a chatbot for providing a specified service, according to an embodiment.

FIG. 15 are views illustrating screens in which an intelligent server determines a chatbot for providing a specified service, according to an embodiment.

Referring to FIG. 15, when a chatbot currently providing a specified service is not capable of performing the task corresponding to a user utterance, the intelligent server 700 may determine at least one other chatbot for performing the task.

According to an embodiment, in screen 1510, the user terminal 100 may provide the user with a service for hotel reservation through the first chatbot 731 of the intelligent server 700.

According to an embodiment, the user terminal 100 may receive user utterances 1511 and 1512 saying that "please make a reservation for a hotel!" and "from September 7th to September 10th, in Osaka, Japan!" According to an embodiment, the user terminal 100 may receive available hotel information 1513 corresponding to the entered user utterances 1511 and 1512, from the intelligent server 700. According to an embodiment, the intelligent server 700 may determine that context information (e.g., Osaka, from September 7th to September 10th) is information capable of being used by one other chatbot (e.g., the second chatbot 732) and may store the context information in a database so as to share the context information between the plurality of chatbots 730.

According to an embodiment, in screen 1520, during the execution of the hotel reservation app, the user terminal 100 may receive a user input 1521 saying that "please make a reservation for a rent car!"

According to an embodiment, the user terminal 100 may receive a response 1522 informing the user that the first chatbot 731 cannot process rental car reservations and asking whether a chatbot capable of performing car rental reservation should be invited to the chat. According to an embodiment, the user terminal 100 may receive a user utterance 1523 saying that "please invite rental car chatbot!" so that the chatbot 732 may be invited to the chat.

According to an embodiment, the user terminal 100 may receive a response 1524 including information about at least one chatbot for booking rental cars. According to an embodiment, the intelligent server 700 may determine at least one chatbot capable of processing the user utterance. The intelligent server 700 may transmit not only information about the determined chatbot but also preview information of the determined at least one chatbot to the user terminal 100. According to an embodiment, the user terminal 100 may receive the determined chatbots and the preview information 1524 from the intelligent server 700.

According to an embodiment, the user terminal 100 may receive a user input to select one of the determined chatbots. According to an embodiment, the intelligent server 700 may transmit context information (e.g., Osaka, from September 7th to September 10th) generated by the first chatbot 731, to the selected chatbot (e.g., the second chatbot 732). According to an embodiment, the user terminal 100 may receive a response 1525 saying that "Would you like to make reservation from September 7th to September 10th in Osaka?" for verifying the transmitted context information. Afterwards, the user terminal 100 may provide the user with confirmation that a car rental reservation has been placed.

The intelligent server 700 according to various embodiments disclosed in connection with FIGS. 1 to 15 may share context information necessary to process a user utterance between a plurality of chatbots 730 providing different services, thereby preventing duplicative user interactions with the intelligent server 700 where the user repeatedly inputs sharable context information for multiple chatbots.

Figure 16:
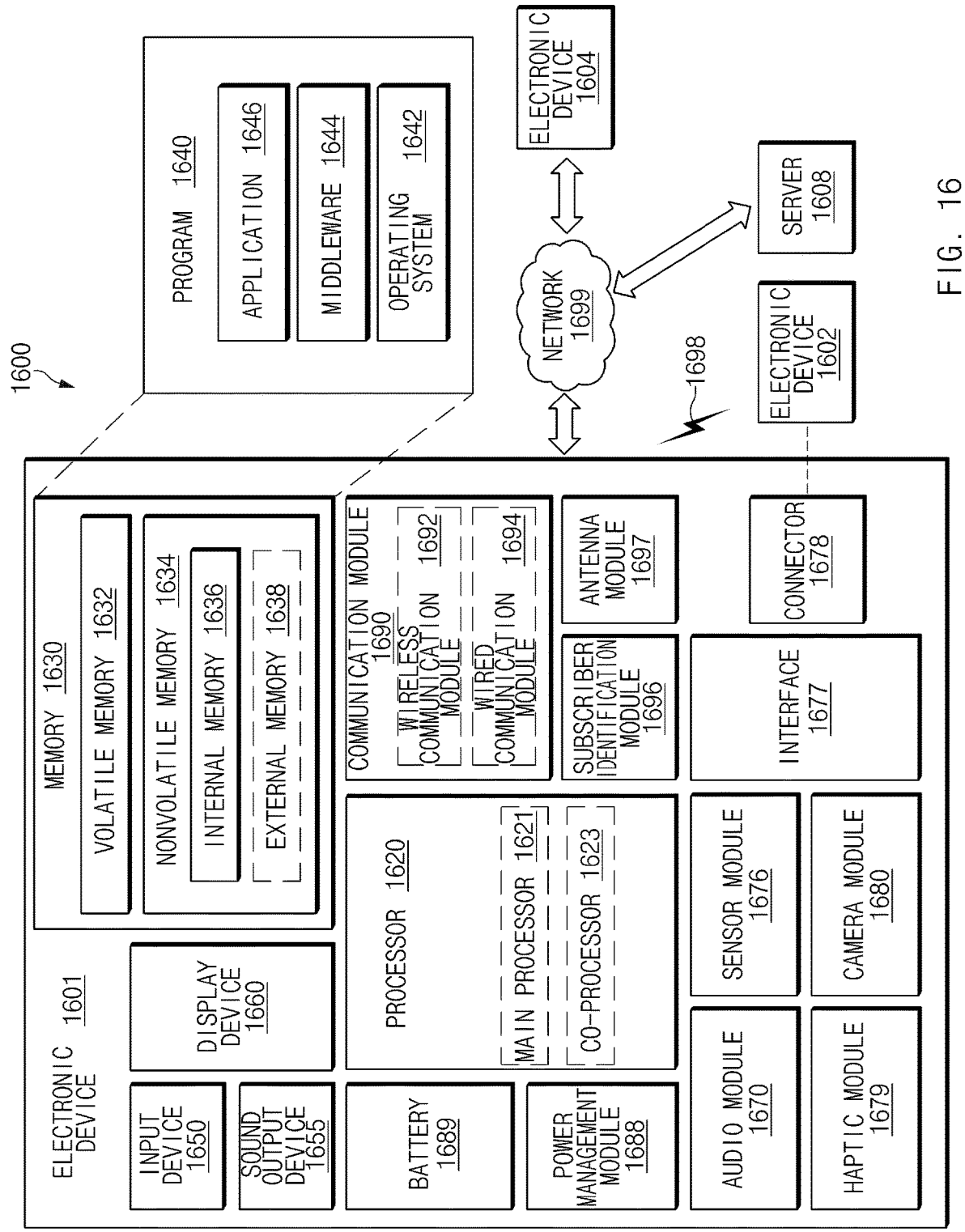
FIG. 16 illustrates a block diagram of an electronic device in a network environment according to various embodiments of the disclosure.

FIG. 16 illustrates a block diagram of an electronic device 1601 in a network environment 1600 according to various embodiments of the disclosure.

Referring to FIG. 16, the electronic device 1601 may include various types of devices. For example, the electronic device 1601 may include at least one of a portable communication device (e.g., smartphones), a computer device (e.g., a PDA, a tablet personal computers (PCs), a laptop PC, a desktop PC, a workstation, or a server), a portable multimedia device (e.g., an e-book reader or an Motion Picture Experts Group phase 1 or phase 2 (MPEG-1 or MPEG-2) audio layer 3 (MP3) player, a portable medical device (e.g., a heart rate, blood glucose, blood pressure, or a thermometer), a camera, or a wearable device. A wearable device may include at least one of an accessory type of a device (e.g., a timepiece, a ring, a bracelet, an anklet, a necklace, glasses, a contact lens, or a head-mounted device (HMD)), one-piece fabric or clothes type of a device (e.g., electronic clothes), a body-attached type of a device (e.g., a skin pad or a tattoo), or a bio-implantable circuit. According to embodiments, the electronic device may include at least one of, for example, televisions (TVs), digital versatile disc (DVD) players, an audio device, audio accessory devices (e.g., a speaker, a headphone, or a headset), a refrigerator, an air conditioner, a cleaner, an oven, a microwave oven, a washing machine, an air cleaner, a set-top box, a home automation control panel, a security control panel, a game console, an electronic dictionary, an electronic key, a camcorder, or an electronic picture frame.

According to another embodiment, the electronic device may include at least one of a navigation device, a global navigation satellite system (GNSS), an event data recorder (EDR) (e.g., a black box for a car, a ship, or a plane), a vehicle infotainment device (e.g., a head-up display for a vehicle), an industrial or home robot, a drone, an automated teller machine (ATM), a point of sales (POS) device, a measurement device (e.g., a water meter, an electricity meter, or a gas meter), or Internet of things (e.g., a light bulb, a sprinkler device, a fire alarm, a thermostat, or a street lamp). According to an embodiment of the disclosure, the electronic device is not limited to the above-described devices. For example, similarly to a smartphone having function of measuring personal bio-information (e.g., a heart rate or blood glucose), the electronic device may provide functions of multiple devices in the complex manner. In the disclosure, the term "user" used herein may refer to a person who uses the electronic device or may refer to a device (e.g., an artificial intelligence electronic apparatus) that uses the electronic device.

Referring to FIG. 16, in the network environment 1600, the electronic device 1601 (e.g., the user terminal 100 of FIG. 1) may communicate with an electronic device 1602 through local wireless communication 1698 or may communicate with an electronic device 1604 or a server 1608 (e.g., the intelligence server 200) through a second network 1699. According to an embodiment, the electronic device 1601 may communicate with the electronic device 1604 through the server 1608.

According to an embodiment, the electronic device 1601 may include a bus 1610, a processor 1620 (e.g., the processor 150), a memory 1630, an input device 1650 (e.g., a microphone or a mouse), a display 1660, an audio module 1670, a sensor module 1676, an interface 1677, a haptic module 1679, a camera module 1680, a power management module 1688, a battery 1689, a communication module 1690, and a subscriber ID module 1696. According to an embodiment, the electronic device 1601 may not include at least one (e.g., the display 1660 or the camera module 1680) of the above-described elements or may further include other element(s).

For example, the bus 1610 may interconnect the above-described elements 1620 to 1690 and may include a circuit for conveying signals (e.g., a control message or data) between the above-described elements.

The processor 1620 (e.g., the processor 160) may include one or more of a central processing unit (CPU), an application processor (AP), a graphical processing unit (GPU), an image signal processor (ISP) of a camera, or a communication processor (CP). According to an embodiment, the processor 1620 may be implemented with a system on chip (SoC) or a system in package (SiP). For example, the processor 1620 may drive an OS or an application to control at least one of another element (e.g., hardware or software element) connected to the processor 1620 and may process and compute various data. The processor 1620 may load a command or data, which is received from at least one of other elements (e.g., the communication module 1690), into a volatile memory 1632 to process the instruction or data and may store the process result data into a nonvolatile memory 1634.

The memory 1630 may include, for example, the volatile memory 1632 or the nonvolatile memory 1634. The volatile memory 1632 may include, for example, a random access memory (RAM) (e.g., a dynamic RAM (DRAM), a static RAM (SRAM), or a synchronous DRAM (SDRAM)). The nonvolatile memory 1634 may include, for example, a read-only memory (ROM), a programmable ROM (PROM), an one time PROM (OTPROM), an erasable PROM (EPROM), an electrically EPROM (EEPROM), a mask ROM, a flash ROM, a flash memory, a hard disk drive, or a solid-state drive (SSD). In addition, the nonvolatile memory 1634 may be configured in the form of an internal memory 1636 or the form of an external memory 1638 which is available through connection only if necessary, according to the connection with the electronic device 1601. The external memory 1638 may further include a flash drive such as compact flash (CF), secure digital (SD), micro-SD, mini-SD, extreme digital (xD), a multimedia card (MMC), or a memory stick. The external memory 1638 may be operatively or physically connected with the electronic device 1601 in a wired manner (e.g., a cable or a universal serial bus (USB)) or a wireless (e.g., Bluetooth) manner.

For example, the memory 1630 may store, for example, at least one different software element, such as an instruction or data associated with the program 1640, of the electronic device 1601. The program 1640 may include, for example, a kernel 1641, a library 1643, an application framework 1645 or an application program (interchangeably, "application") 1647.

The input device 1650 may include a microphone, a mouse, or a keyboard. According to an embodiment, the keyboard may include a keyboard physically connected or a keyboard virtually displayed through the display 1660.

The display 1660 may include a display, a hologram device or a projector, and a control circuit to control a relevant device. The screen may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 1601.

The audio module 1670 may convert, for example, from a sound into an electrical signal or from an electrical signal into the sound. According to an embodiment, the audio module 1670 may acquire sound through the input device 1650 (e.g., a microphone) or may output sound through an output device (not illustrated) (e.g., a speaker or a receiver) included in the electronic device 1601, an external electronic device (e.g., the electronic device 1602 (e.g., a wireless speaker or a wireless headphone)) or an electronic device 1606 (e.g., a wired speaker or a wired headphone) connected with the electronic device 1601.

The sensor module 1676 may measure or detect, for example, an internal operating state (e.g., power or temperature) or an external environment state (e.g., an altitude, a humidity, or brightness) of the electronic device 1601 to generate an electrical signal or a data value corresponding to the information of the measured state or the detected state. The sensor module 1676 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint sensor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an ultraviolet (UV) sensor. The sensor module 1676 may further include a control circuit for controlling at least one or more sensors included therein. According to an embodiment, the electronic device 1601 may control the sensor module 1676 by using the processor 1620 or a processor (e.g., a sensor hub) separate from the processor 1620. In the case that the separate processor (e.g., a sensor hub) is used, while the processor 1620 is in a sleep state, the electronic device 1601 may operate without awakening the processor 1620 to control at least a portion of the operation or the state of the sensor module 1676.

According to an embodiment, the interface 1677 may include a high definition multimedia interface (HDMI), a USB, an optical interface, a recommended standard 232 (RS-232), a D-subminiature (D-sub), a mobile high-definition link (MHL) interface, a SD card/MMC interface, or an audio interface. A connector 1678 may physically connect the electronic device 1601 and the electronic device 1606. According to an embodiment, the connector 1678 may include, for example, an USB connector, an SD card/MMC connector, or an audio connector (e.g., a headphone connector).

The haptic module 1679 may convert an electrical signal into mechanical stimulation (e.g., vibration or motion) or into electrical stimulation. For example, the haptic module 1679 may apply tactile or kinesthetic stimulation to a user. The haptic module 1679 may include, for example, a motor, a piezoelectric element, or an electric stimulator.

The camera module 1680 may capture, for example, a still image and a moving picture. According to an embodiment, the camera module 1680 may include at least one lens (e.g., a wide-angle lens and a telephoto lens, or a front lens and a rear lens), an image sensor, an ISP, or a flash (e.g., a LED or a xenon lamp).

The power management module 1688, which is to manage the power of the electronic device 1601, may constitute at least a portion of a power management integrated circuit (PMIC).

The battery 1689 may include a primary cell, a secondary cell, or a fuel cell and may be recharged by an external power source to supply power at least one element of the electronic device 1601.

The communication module 1690 may establish a communication channel between the electronic device 1601 and an external device (e.g., the first external electronic device 1602, the second external electronic device 1604, or the server 1608). The communication module 1690 may support wired communication or wireless communication through the established communication channel. According to an embodiment, the communication module 1690 may include a wireless communication module 1692 or a wired communication module 1694. The communication module 1690 may communicate with the external device through a local wireless communication 1698 (e.g. a wireless local area network (LAN) such as Bluetooth or infrared data association (IrDA)) or a second network 1699 (e.g., a wireless wide area network (WAN) such as a cellular network).

The wireless communication module 1692 may support, for example, cellular communication, local wireless communication, GNSS communication. The cellular communication may include, for example, long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The local wireless communication may include wireless fidelity (Wi-Fi), Wi-Fi direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a GPS, a global navigation satellite system (Glonass), Beidou navigation satellite system (Beidou), a European global satellite-based navigation system (Galileo), or the like. In the disclosure, "GPS" and "GNSS" may be interchangeably used.

According to an embodiment, when the wireless communication module 1692 supports cellar communication, the wireless communication module 1692 may, for example, identify or authenticate the electronic device 1601 within a communication network using the subscriber ID module 1696. According to an embodiment, the wireless communication module 1692 may include a CP separate from the processor 1620 (e.g., an AP). In this case, the CP may perform at least a portion of functions associated with at least one of elements 1610 to 1696 of the electronic device 1601 in substitute for the processor 1620 when the processor 1620 is in an inactive (sleep) state, and together with the processor 1620 when the processor 1620 is in an active state. According to an embodiment, the wireless communication module 1692 may include a plurality of communication modules, each supporting only a relevant communication scheme among cellular communication, short-range wireless communication, or a GNSS communication scheme.

The wired communication module 1694 may include, for example, include a LAN service, a power line communication, or a plain old telephone service (POTS).

For example, the local wireless communication 1698 may employ, for example, Wi-Fi direct or Bluetooth for transmitting or receiving instructions or data through wireless direct connection between the electronic device 1601 and the first external electronic device 1602. The second network 1699 may include a telecommunication network (e.g., a computer network such as a LAN or a WAN, the Internet or a telephone network) for transmitting or receiving instructions or data between the electronic device 1601 and the second electronic device 1604.

According to various embodiments, the instructions or the data may be transmitted or received between the electronic device 1601 and the second external electronic device 1604 through the server 1608 connected with the second network. Each of the external first and second external electronic devices 1602 and 1604 may be a device of which the type is different from or the same as that of the electronic device 1601. According to various embodiments, all or a part of operations that the electronic device 1601 will perform may be executed by another or a plurality of electronic apparatuses (e.g., the electronic devices 1602 and 1604 or the server 1608). According to an embodiment, in the case that the electronic device 1601 executes any function or service automatically or in response to a request, the electronic device 1601 may not perform the function or the service internally, but may alternatively or additionally transmit requests for at least a part of a function associated with the electronic device 1601 to another device (e.g., the electronic apparatus 1602 or 1604 or the server 1608). The other electronic apparatus (e.g., the electronic apparatus 1602 or 1604 or the server 1608) may execute the requested function or additional function and may transmit the execution result to the electronic device 1601. The electronic device 1601 may provide the requested function or service using the received result or may additionally process the received result to provide the requested function or service. To this end, for example, cloud computing, distributed computing, or client-server computing may be used.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "at least one of A and/or B", "A, B, or C", or "at least one of A, B, and/or C", and the like used herein may include any and all combinations of one or more of the associated listed items. Expressions such as "first", or "second" and the like, may be used for corresponding components regardless of importance or order and are used to distinguish one component from another without limiting the components. When an (e.g., first) element is referred to as being "(operatively or communicatively) coupled with/ to" or "connected to" another (e.g., second) element, it may be directly coupled with/to or connected to the other element or an intervening element (e.g., a third element) may be present.

According to the situation, the expression "adapted to or configured to" used herein may be interchangeably used as, for example, the expression "suitable for", "having the capacity to", "changed to", "made to", "capable of" or "designed to". The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a CPU or an AP) which performs corresponding operations by executing one or more software programs which are stored in a memory device (e.g., the memory 1630).

The term "module" used in this specification may include a unit implemented with hardware, software, or firmware. For example, the term "module" may be interchangeably used with the term "logic", "logic block", "component", "circuit", and the like. The "module" may be an integrated component, a minimum unit for performing one or more functions, or a part thereof. The "module" may be implemented mechanically or electronically. For example, the module may include a well-known or to-be-developed application-specific integrated circuit (ASIC) chip, field-programmable gate arrays (FPGAs), or programmable logic device that perform any operations.

According to various embodiments, at least a part of an apparatus (e.g., modules or functions thereof) or a method (e.g., operations) may be, for example, implemented by instructions stored in a computer-readable storage media (e.g., the memory 1630) in the form of a program module. The instruction, when executed by a processor (e.g., a processor 1620), may cause the processor to perform a function corresponding to the instruction. The computer-readable recording medium may include a hard disk, a floppy disk, a magnetic media (e.g., a magnetic tape), an optical media (e.g., a compact disc-ROM (CD-ROM) and a DVD, a magneto-optical media (e.g., a floptical disk)), an embedded memory, and the like. The instruction may contain a code made by a compiler or a code executable by an interpreter.

Each element (e.g., a module or a program module) according to various embodiments may be composed of single entity or a plurality of entities, and a part of the above-described sub-elements may be omitted or may further include other elements. Alternatively or additionally, after being integrated in one entity, some elements (e.g., a module or a program module) may identically or similarly perform the function executed by each corresponding element before integration. Operations executed by modules, program modules, or other elements may be executed by a successive method, a parallel method, a repeated method, or a heuristic method. Alternatively, at least some of the operations may be executed in another order or may be omitted, or any other operation may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A system comprising:
a communication interface;
at least one processor operatively connected to the communication interface; and
at least one memory operatively connected to the at least one processor,
wherein the at least one memory stores instructions that, when executed, cause the processor to provide:
an automatic speech recognition (ASR) module; and
a plurality of natural language understanding (NLU) modules that operate independently of one another,
and further cause the processor to:
receive first voice data including a first user utterance via the communication interface;
process the first voice data using the ASR module to generate first text data;
process the first text data using a first NLU module of the plurality of NLU modules into a first intent and one or more context information items associated with the first intent, wherein the one or more context information items are information obtained from the first voice data that and are distinct from the first intent;
provide a first response via the communication interface, based on the first intent and the one or more context information items; and
provide at least part of the one or more context information items to at least one other NLU module of the plurality of NLU modules to allow the at least one other NLU module to provide at least one response based on the one or more context information items.

2. The system of claim 1, wherein the one or more context information items include one or more parameters identified by the first NLU module.

3. The system of claim 2, wherein the one or more parameters include information necessary to perform a task corresponding to the first intent.

4. The system of claim 1, wherein the instructions cause the processor to:
provide a plurality of chatbots, each of which is associated with a respective one of the plurality of NLU modules.

5. The system of claim 1, wherein the instructions cause the processor to:
receive second voice data including a second user utterance via the communication interface;
process the second voice data using the ASR module to generate second text data;
process the second text data into a second intent by using a second NLU module of the plurality of NLU modules; and
provide a second response based on the second intent and the one or more context information items transmitted from the first NLU module, via the communication interface.

6. The system of claim 1, wherein the instructions cause the processor to:
transmit information about at least one NLU module, which is selected based on the one or more context information items, from among the plurality of NLU modules to a user terminal via the communication interface;
receive a user input for selecting one NLU module among the at least one NLU module via the communication interface; and
provide a second response using the selected one NLU module.

7. The system of claim 1, wherein the instructions cause the processor to:
convert the at least a part of the one or more context information items into a specified format to store the converted part of the one or more context information items in the at least one memory; and
in providing the at least part of the one or more context information items to the at least one other NLU module of the plurality of NLU modules, transmit the converted part of the one or more context information items to the at least one other NLU module.

8. The system of claim 7, wherein the specified format is defined as at least one field.

9. The system of claim 1, wherein, in providing the at least part of the one or more context information items to the at least one other NLU module of the plurality of NLU modules, the instructions cause the processor to:
change the at least part of the one or more context information items to third voice data; and
transmit the third voice data to the at least one other NLU module.

10. The system of claim 1, wherein the instructions cause the processor to:
select the first NLU module based on the first voice data.

11. A method for sharing context information in an electronic device, the method comprising:
receiving first voice data including a first user utterance;
processing the first voice data to generate first text data;
processing the first text data by using a first NLU module of a plurality of NLU modules into a first intent and one or more context information items associated with the first intent, wherein the one or more context information items are information obtained from the first voice data that and are distinct from the first intent;
providing a first response based at least partly on the first intent and the one or more context information items; and
providing at least part of the one or more context information items to at least one other NLU module of the plurality of NLU modules to allow the at least one other NLU module to provide at least one response based on the one or more context information items.

12. The method of claim 11, wherein the one or more context information items include one or more parameters identified by the first NLU module.

13. The method of claim 12, wherein the one or more parameters include information necessary to perform a task corresponding to the first intent.

14. The method of claim 11, wherein the plurality of NLU modules provide a plurality of chatbots, respectively.

15. The method of claim 11, further comprising:
receiving second voice data including a second user utterance;
processing the second voice data to generate second text data;
processing the second text data into a second intent by using a second NLU module of the plurality of NLU modules; and
providing a second response based on the second intent and the one or more context information items transmitted from the first NLU module.

16. The method of claim 11, further comprising:
transmitting information about at least one NLU module, which is selected based on the one or more context information items, from among the plurality of NLU modules to a user terminal;
receiving a user input for selecting one NLU module among the at least one NLU module; and
processing second text data as a second intent using the selected one NLU module.

17. The method of claim 11, wherein the providing of the at least part of the one or more context information items to the at least one other NLU module of the plurality of NLU modules includes:
converting the at least part of the one or more context information items into a format necessary for the at least one other NLU module; and
transmitting the converted part of the one or more context information items to the at least one other NLU module.

18. The method of claim 17, wherein the format is defined as at least one field.

19. The method of claim 11, wherein the providing of the at least part of the one or more context information items to the at least one other NLU module of the plurality of NLU modules includes:
changing the at least part of the one or more context information items to third voice data; and
transmitting the third voice data to the at least one other NLU module.

20. The method of claim 11, further comprising:
selecting the first NLU module based on the first voice data.

* * * * *